(12) United States Patent
Mertz et al.

(10) Patent No.: US 10,678,037 B2
(45) Date of Patent: Jun. 9, 2020

(54) REVERBERATION MICROSCOPY SYSTEMS AND METHODS

(71) Applicant: Trustees of Boston University, Boston, MA (US)

(72) Inventors: Jerome Charles Mertz, Newton, MA (US); Devin Robert Beaulieu, Brookline, MA (US); Thomas Gary Bifano, Mansfield, MA (US)

(73) Assignee: Trustees of Boston University, Boston, MA (US)

( * ) Notice: Subject to any disclaimer, the term of this patent is extended or adjusted under 35 U.S.C. 154(b) by 0 days.

(21) Appl. No.: 16/510,407

(22) Filed: Jul. 12, 2019

(65) Prior Publication Data

US 2020/0018940 A1 Jan. 16, 2020

Related U.S. Application Data

(60) Provisional application No. 62/697,662, filed on Jul. 13, 2018.

(51) Int. Cl.
*G01N 21/25* (2006.01)
*G02B 21/00* (2006.01)
*G01N 21/64* (2006.01)

(52) U.S. Cl.
CPC ..... *G02B 21/0032* (2013.01); *G02B 21/0048* (2013.01); *G02B 21/0076* (2013.01); *G01N 21/6402* (2013.01); *G01N 21/6458* (2013.01); *G01N 2201/06113* (2013.01)

(58) Field of Classification Search
CPC ............ G02B 21/0032; G02B 21/0048; G02B 21/0076; G01N 21/6458; G01N 2201/06113; G01N 21/6402; B23K 26/00; B23K 26/02
See application file for complete search history.

(56) References Cited

U.S. PATENT DOCUMENTS

| | | | |
|---|---|---|---|
| 5,337,333 A * | 8/1994 | Daly | H01S 3/0057 372/700 |
| 8,093,530 B2 * | 1/2012 | Nishiwaki | B23K 26/38 219/121.61 |
| 2013/0277341 A1 * | 10/2013 | Dvorkin | B23K 26/067 219/121.67 |

OTHER PUBLICATIONS

Yang, W. et al.; "Simultaneous Multi-plane Imaging of Neural Circuits," Neuron, vol. 89, No. 2, pp. 269-284, 2015.
(Continued)

*Primary Examiner* — Abdullahi Nur
(74) *Attorney, Agent, or Firm* — Nixon Peabody LLP

(57) ABSTRACT

A method for obtaining one or more images of a sample using a microscope includes dividing, using a reverberation cavity, a first one of a plurality of laser pulses into a plurality of sequential sub-pulses, each of the plurality of sequential sub-pulses having a power that is less than a previous one of the plurality of sequential sub-pulses, directing, using the one or more lenses of the microscope, the plurality of sequential sub-pulses onto a portion of the sample to generate a plurality of signals, each of the plurality of signals being associated with a different depth within the sample, and detecting the plurality of signals from the sample to generate one or more images of at least a portion of the sample.

29 Claims, 16 Drawing Sheets
(3 of 16 Drawing Sheet(s) Filed in Color)

(56) References Cited

OTHER PUBLICATIONS

Amir, W. et al.; "Simultaneous imaging of multiple focal planes using a two-photon scanning microscope.," Opt. Lett., vol. 32, No. 12, pp. 1731-1733, Jun. 2007.
Cheng, A. et al.; "Simultaneous two-photon calcium imaging at different depths with spatiotemporal multiplexing," Nat. Methods, vol. 8, No. 2, pp. 139-142, 2011.
Chen, J. L. et al.; "Long-range population dynamics of anatomically defined neocortical networks," Elife, vol. 5, p. e14679, 2016.
Grewe, B. F. et al.; Fast two-layer two-photon imaging of neuronal cell populations using an electrically tunable lens., *Biomed. Opt. Express*, vol. 2, No. 7, pp. 2035-2046, Jul. 2011.
Sofroniew, N. J. et al.; "A large field of view two-photon mesoscope with subcellular resolution for in vivo imaging," *Elife*, vol. 5, p. e14472, 2016.
Kong, L. et al.; "Continuous volumetric imaging via an optical phase-locked ultrasound lens.," *Nat. Methods*, vol. 12, No. 8, pp. 759-762, 2015.
Theriault, G. et al.; "Extended depth of field microscopy for rapid volumetric two-photon imaging," vol. 21, No. 8, pp. 9246-9252, 2013.
Lu, R. et al.; "Video-rate volumetric functional imaging of the brain at synaptic resolution," *Nat. Neurosci*, vol. 20, p. 620, 2017.

\* cited by examiner

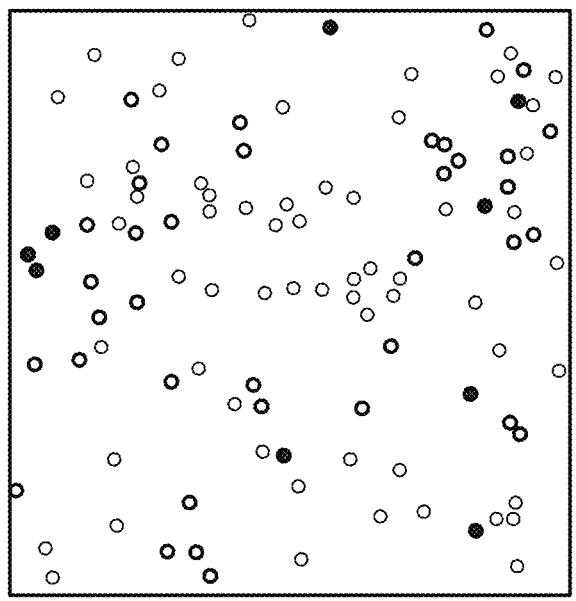
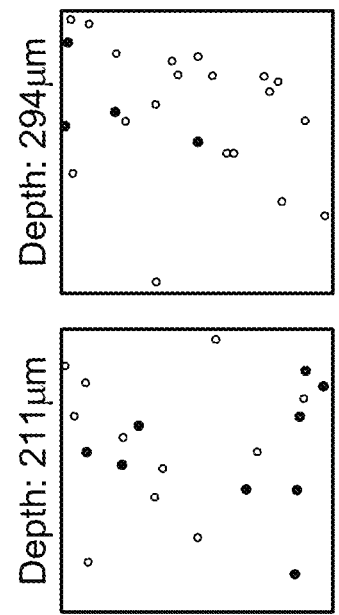
FIG. 9B
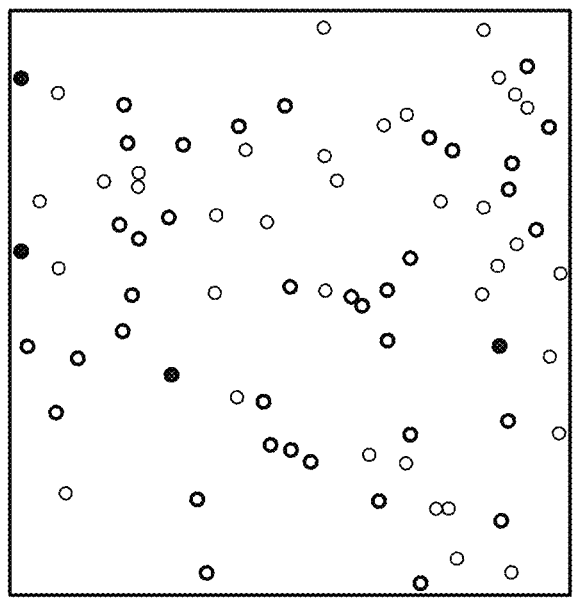
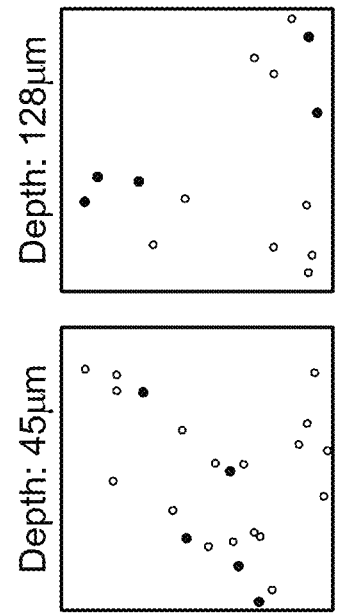
FIG. 9A

REVERBERATION MICROSCOPY SYSTEMS AND METHODS

CROSS-REFERENCE TO RELATED APPLICATIONS

This application claims the benefit of and priority to U.S. Provisional Application No. 62/697,662, filed on Jul. 13, 2018, which is hereby incorporated by reference herein in its entirety.

STATEMENT REGARDING FEDERALLY SPONSORED RESEARCH

This invention was made with Government Support under Contract No. EEC1647837 awarded by the National Science Foundation and Contract No. EY027549 awarded by the National Institutes of Health. The Government has certain rights in the invention

TECHNICAL FIELD

This disclosure relates to microscopy and more specifically to microscope reverberation cavity devices configured to aid in quickly focusing to multiple depths of a sample to generate one or more volumetric images of the sample.

BACKGROUND

Volumetric imaging of a sample with microscopic resolution is useful in a variety of applications. For example, optical imaging of in-vivo biological tissue can produce an optical signal (e.g., fluorescence) that provides information on neuron activity and dynamics. In such applications, typically, three-dimensional volumetric images of a sample are created from a stack of two-dimensional images obtained from a plurality of depths within the sample. Often, each two-dimensional image comprising the stack is optically sectioned such that the signal contained in each two-dimensional image is not distorted with background signals from other two-dimensional images in the stack.

There are several challenges to achieving fast, volumetric images of a sample. For example, this type of imaging requires the microscopy system to very quickly acquire multiple microscopic resolution, optically sectioned images from a three-dimensional volume. For another example, light scattering in thick samples can often lead to image degradation (e.g., blur, contrast reduction, signal loss, etc.) that increases with increasing depth penetration into the sample. Thus, a need exists for devices, systems, and methods for quickly generating one or more volumetric images of a sample that have limited degradation. The present disclosure is directed to solving these problems and addressing other needs.

SUMMARY

According to some implementations of the present disclosure, a method for obtaining one or more images of a sample using a microscope, the method including dividing, using a reverberation cavity, a first one of a plurality of laser pulses into a plurality of sequential sub-pulses, each of the plurality of sequential sub-pulses having a power that is less than a previous one of the plurality of sequential sub-pulses, directing, using the one or more lenses of the microscope, the plurality of sequential sub-pulses onto a portion of the sample to generate a plurality of signals, each of the plurality of signals being associated with a different depth within the sample, and detecting the plurality of signals from the sample to generate the one or more images of at least a portion of the sample.

According to some implementations of the present disclosure, a reverberation cavity for a microscope includes a plurality of mirrors, a plurality of lenses, and a beamsplitter being positioned such that responsive to a laser pulse being incident to the beamsplitter, the beamsplitter is configured to direct a first portion of the laser pulse to a two-dimensional scanner of the microscope and direct a second portion of the laser pulse to one of the plurality of mirrors, the plurality of mirrors and the plurality of lenses being positioned such that the second portion of the laser pulse is directed along a round-trip path length through the plurality of lenses and incident to the beamsplitter.

According to some implementations of the present disclosure, a reverberation cavity for a microscope includes a first pair of mirrors, an opposing second pair of mirrors that is moveable along a mirror translation stage relative to the first pair of mirrors to adjust a path length, a plurality of lenses positioned between the first pair of mirrors and the opposing second pair of mirrors along the path length, and a beamsplitter being positioned such that responsive to a laser pulse being incident to the beamsplitter, the beamsplitter is configured to a direct a first sub-pulse to a two-dimensional scanner of the microscope and a second sub-pulse to one of the first pair of mirrors such that the second sub-pulse is directed along the path length and returns to the beamsplitter.

According to some implementations of the present disclosure, a scanning microscope system for generating one or more images of a sample includes a laser source configured to emit a plurality of laser pulses at a predetermined frequency, a reverberation cavity configured to (i) divide each of the plurality of laser pulses into a plurality of sequential sub-pulses, each of the plurality of sequential sub-pulses corresponding to sequential depths within the sample and (ii) direct the plurality of sequential sub-pulses to a two-dimensional scanner, the two-dimensional scanner being configured to position the plurality of sequential sub-pulses on a transverse location in the sample, a plurality of lenses positioned between the two-dimensional scanner and the sample location; and a detection mirror positioned to direct a plurality of signals from the sample location to a detection device, each of the plurality of signals corresponding to one of the plurality of sequential sub-pulses, the detection device being configured to associate the plurality of signals with one or more output channels.

The foregoing and additional aspects and implementations of the present disclosure will be apparent to those of ordinary skill in the art in view of the detailed description of various embodiments and/or implementations, which is made with reference to the drawings, a brief description of which is provided next.

BRIEF DESCRIPTION OF THE DRAWINGS

This application file contains at least one drawing executed in color. Copies of this patent application publication with color drawings will be provided by the Office upon request and payment of the necessary fee.

The foregoing and other advantages of the present disclosure will become apparent upon reading the following detailed description and upon reference to the drawings.

FIG. 9A includes exemplary images of a sample taken using a microscope system not including a reverberation cavity;

FIG. 9B includes exemplary images of a sample taken using a microscope system including a reverberation cavity according to some implementations of the present disclosure;

Figure 1:
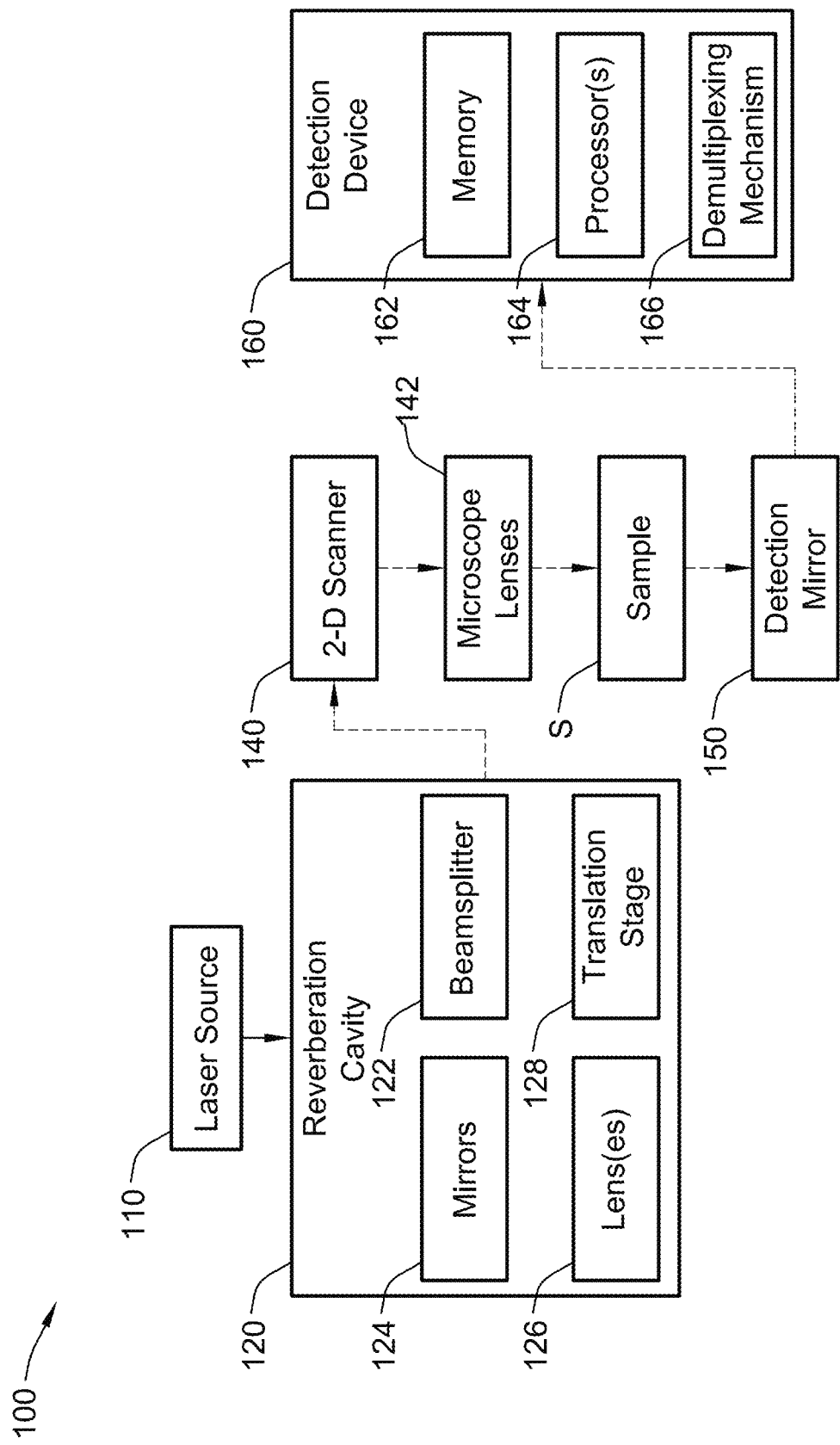
FIG. 1 is an illustrative block diagram of a scanning microscope system according to some implementations of the present disclosure.

While the present disclosure is susceptible to various modifications and alternative forms, specific implementations have been shown by way of example in the drawings and will be described in detail herein. It should be understood, however, that the present disclosure is not intended to be limited to the particular forms disclosed. Rather, the present disclosure is to cover all modifications, equivalents, and alternatives falling within the spirit and scope of the present disclosure as defined by the appended claims.

DETAILED DESCRIPTION

While this invention is susceptible of embodiment in many different forms, there is shown in the drawings and will herein be described in detail preferred aspects of the invention with the understanding that the present disclosure is to be considered as an exemplification of the principles of the invention and is not intended to limit the broad aspect of the invention to the aspects illustrated. For purposes of the present detailed description, the singular includes the plural and vice versa (unless specifically disclaimed); the word "or" shall be both conjunctive and disjunctive; the word "all" means "any and all"; the word "any" means "any and all"; and the word "including" means "including without limitation." Moreover, words of approximation, such as "about," "almost," "substantially," "approximately," and the like, can be used herein to mean "at," "near," or "nearly at," or "within 3-5% of," or "within acceptable manufacturing tolerances," or any logical combination thereof, for example.

Referring to FIG. 1, a scanning microscope system 100 includes a laser source 110, a reverberation cavity 120, a two-dimensional scanner 140, one or more microscope lenses 142, a detection mirror 150, and a detection device 160. Generally, the scanning microscope system 100 is used to quickly obtain one or more volumetric images of a sample S (e.g., in-vivo biological tissue or the like).

The laser source 110 of the scanning microscope system 100 is configured to emit a plurality of laser pulses (e.g., laser beams) that can be focused on a desired location (e.g., the two-dimensional scanner 140). The laser source 110 emits the plurality of laser pulses at a predetermined frequency, such as, for example, between about 1 MHz and about 150 MHz. The laser source 110 has a power P that can be, for example, between about 100 mW and about 10 W.

Each laser pulse from the laser source 110 is directed to the reverberation cavity 120, which divides each laser pulse into a plurality of sequential sub-pulses, where the power of each of the sequential sub-pulses is less than the previous one of the plurality of sequential sub-pulses. As described in further detail herein, when the plurality of sequential sub-pulses reach the sample S, a plurality of signals are produced (e.g., fluorescence signals) that can be detected and processed by the detection device 160 to generate one or more volumetric images of the sample S.

It is contemplated that in certain aspects the reverberation cavity 120 includes a beamsplitter 122, a plurality of mirrors 124, a plurality of lenses 126, and a mirror translation stage 128. The reverberation cavity 120 is configured such that each sub-pulse in the plurality of sequential sub-pulses is focused to a shallower depth within the sample S compared to the previous one of the plurality of sequential sub-pulses. In other words, each of the plurality of sequential sub-pulses has an incident power $P_n$ that is focused to a depth $z_n$.

The beamsplitter 122 of the reverberation cavity 120 is configured such that when each laser pulse reaches the beamsplitter 122, the beamsplitter 122 divides the laser pulse into a first portion and a second portion. The beamsplitter 122 can include one or more glass prisms and/or one or more mirrors with or without an optical coating(s) to aid in dividing each laser pulse. In some implementations, the first portion of the laser pulse is transmitted through the beamsplitter 122 and continues on to the two-dimensional scanner 140, while the second portion of the laser pulse is reflected by the beamsplitter 122 into the reverberation cavity 120 (which eventually reimages that portion back to the beamsplitter 122). In other words, each time a laser pulse (or a portion of a laser pulse) reaches the beamsplitter 122, the beamsplitter 122 divides the laser pulse (or portion of the laser pulse) into two portions.

The power of each divided portion of the laser pulse created by the beamsplitter 122 can be the same or different from one another. For example, the power of both the first portion and the second portion can be half of the original laser pulse emitted from the laser source 110 (e.g., the first portion is equal to the second portion). In other implementations, the first portion can be between about 1% and about 99% of the power of the original laser pulse while the second portion can be between about 99% and about 1% of the power of the original laser pulse. Advantageously, there is no power loss from the initial laser pulse when the reverberation cavity 120 divides the laser pulse into a plurality of sequential sub-pulses. Instead, the power from the initial laser pulse is redistributed over time.

In a turbid or scattering sample, the ballistic pulse power that arrives at each focal depth $z_n$ within the sample S is defined according to equation 1 below:

$$P(z_n) = P_n \times e^{-z_n/l_a} \quad \text{Equation 1}$$

In equation 1, $P_n$ is the incident pulse power at the sample (where z=0) associated with sub-pulse n, and $l_a$ is the attenuation length associated with the sample medium at the illumination wavelength (e.g., for biological tissue such as brain tissue and illumination wavelength of about 1 micron, $l_a$ is about 150 microns) As described in further detail herein, when each sub-pulse reaches the sample S, a signal $F_n$ (e.g., a fluorescence signal) can be detected in order to generate one or more images of the sample S, such that:

$$F_n \propto P^m(z_n) = P_n^m \times e^{-mz_n/l_a} \quad \text{Equation 2:}$$

In equation 2, m is the multiphoton order (e.g., m=2 for two-photon microscopy, m=3 for three-photon microscopy, etc.) Preferably, the detected signal strength is the same for each depth $z_n$ within the sample S, which leads to the condition according to equations 3 and 4 below, where equation 4 ($\Delta z$) defines the required separation between optical sections.

$$F_{n+1}/F_n = P_{n+1}^m/P_n^m e^{-m\Delta z/l_a} \quad \text{Equation 3}$$

$$\Delta z = |z_{n+1} - z_n| \quad \text{Equation 4:}$$

Moreover, each sub-pulse in the plurality of sequential sub-pulses is separated from other sub-pulses by a time interval $\Delta\tau$ according to equation 4 below:

$$\Delta\tau = L/c \quad \text{Equation 5:}$$

In equation 5, L is the length of the reverberation cavity (e.g., the distance that each sub-pulse travels as it exits the beamsplitter and is directed back onto the beamsplitter using the plurality of mirrors) and c is the speed of light. The reverberation cavity 120 is used to adjust both $\Delta z$ from equation 4 and $\Delta\tau$ from equation 5 above to generate one or more desired volumetric images of the sample S. In some implementations, the time interval $\Delta\tau$ can be between about 1 nanoseconds and about 20 nanoseconds, between about 2 nanoseconds and about 10 nanoseconds, between about 4 nanoseconds and about 8 nanoseconds, etc.

The plurality of mirrors 124 of the reverberation cavity 120 are positioned such that the second portion of the laser pulse that is reflected by the beamsplitter 122 (i.e., the portion that is not directed to the two-dimensional scanner 140) is directed onto one of the plurality of mirrors 124. Then, another one of the plurality of mirrors 124 directs the second portion of the laser pulse back onto the beamsplitter 122 such that the second portion is divided into another two portions. The plurality of mirrors 124 can generally include any suitable number of mirrors (e.g., three mirrors, four mirrors, six mirrors, eight mirrors etc.) In addition, the plurality of mirrors 124 can include the same or different types of mirrors (e.g., one or more standard mirrors, one or more mirrors with controllable curvature, one or more deformable mirrors, etc.)

The plurality of lenses 126 are generally used to aid in reimaging the second portion of the laser pulse that is reflected by the plurality of mirrors 124 back onto the beamsplitter 122 after traveling along the path length L, but with a focus offset that causes each sub-pulse to focus to a shallower depth in the sample S than the previous sub-pulse. Each of the plurality of lenses 126 has a focal length f and is positioned between an opposing pair of the plurality of mirrors 124 (e.g., a first lens is positioned between a first pair of mirrors and a second lens is positioned between a second pair of mirrors). Generally, the reverberation cavity 120 can include any suitable combination of mirrors and/or lenses, such as, for example, four mirrors and two lenses, three mirrors and two lenses, three mirrors and three lenses, etc.

In some implementations, the reverberation cavity 120 includes the mirror translation stage 128, which is coupled to one or more mirrors of the plurality of mirrors 124. The mirror translation stage 128 can include one or more motors to move one or more of the plurality of mirrors 124 in one or more dimensions (e.g., x and y). For example, the mirror translation stage 128 can be used to adjust a distance d between opposing pairs of the plurality of mirrors 124 (e.g., in an implementation where the plurality of mirrors 124 includes four mirrors). In some implementations, the mirror translation stage 128 can be moved manually (e.g., by a user) to adjust the distance d between opposing pairs of the plurality of mirrors 124.

As described herein, the reverberation cavity 120 can be used to change both $\Delta z$ from equation 4 and $\Delta\tau$ from equation 5 above. According to equations 6 and 7 below, changing the distance d between the plurality of mirrors 124 using the translation stage 128 adjusts $\Delta z$.

$$\Delta z = M^2 \times 2d \quad \text{Equation 6}$$

$$M = \left(\frac{f}{f_{scan}}\right) \times \left(\frac{f_{tube}}{f_{obj}}\right) \quad \text{Equation 7}$$

In equations 6 and 7, the variable M refers to magnification. In equation 7, f is the focal length of the plurality of lenses 126 of the reverberation cavity 120, $f_{scan}$ is the focal length of a scanning lens of the plurality of microscope lenses 142, $f_{tube}$ is the focal length of a tube lens of the plurality of microscope lenses 142, and $f_{obj}$ is the focal length of an objective lens of the plurality of microscope lenses 142. Similarly, the path length L of the reverberation cavity 120 is can be adjusted to adjust Δτ according to equation 7 below:

$$L=4f+2d \quad \text{Equation 8:}$$

After exiting the reverberation cavity 120, the plurality of sequential sub-pulses are then directed to the two-dimensional scanner 140 of the microscope system 100. The two-dimensional scanner 140, in turn, directs the plurality of sequential sub-pulses through the plurality of microscope lenses 142 and onto the sample S. The two-dimensional scanner 140 is configured to move the plurality of sequential sub-pulses in two-dimensions parallel to the surface of the sample S. The two-dimensional scanner 140 can include one or more mirrors to aid in focusing the plurality of sequential sub-pulses onto a desired location in the sample S (e.g., a first mirror to focus in an X dimension and a second mirror to focus in a Y dimension). The plurality of microscope lenses 142 are positioned between the two-dimensional scanner 140 and the sample S, and can include, for example, a tube lens, a scanning lens, an objective lens, or any combination thereof. Each of the plurality of microscope lenses 142 has a focal length f.

When the plurality of sequential sub-pulses reach the sample S, a plurality of corresponding signals are generated, which are then directed by the detection mirror 150 to the detection device 160 for processing. In some implementations, the plurality of signals are fluorescence signals, although other types of signals are contemplated (e.g., harmonic generation or scattering type signals). In some implementations, the plurality of sequential sub-pulses from the reverberation cavity 120 have a first color (e.g., infrared) and the plurality of fluorescence signals are a different color (e.g., green).

The detection mirror 150 is positioned between the sample S and the detection device 160. More specifically, the detection mirror 150 is angled (e.g., at about 45 degrees relative to horizontal) such that signals from the sample S are directed to the detection device 160. In some implementations, the detection mirror 150 can be a dichromatic mirror that transmits one color and reflects another color to separate out the fluorescence signals (e.g., having a green color) from the sub-pulses (e.g., having an infrared color).

Each of the plurality of signals is associated with a corresponding one of the plurality of sequential sub-pulses 230 and a depth $z_n$ within the sample S. The detection device 160 detects each of these signals and is used to generate one or more volumetric images of the sample S. The detection device 160 includes one or more memory devices 162, one or more processors 164 (e.g., general or special microprocessors) for executing instructed stored in the one or more memory devices 162, and an optional signal demultiplexing mechanism 166. The optional signal demultiplexing mechanism 166 is configured to parse the signals $F_n$ emitted from the sample S into different output channels, where each output channel corresponds to different time delays between the received signals. This signal parsing can be performed electronically in real-time or by software post-acquisition. The optional signal demulitplexing mechanism 166 can include, for example, one or more electronic switches, one or more field-programmable gate arrays, one or more graphics processing units, etc., or any combination thereof.

As described in further detail herein, in some implementations, the detection device 160 can be configured to fully demultiplex the plurality of signals from the sample S such that each sub-signal is associated with a different output channel, where each output channel is associated with a depth $z_n$ in the sample S. In such implementations, data reproducible as two-dimensional images are produced for each depth $z_n$ within the sample S at a location, and these two-dimensional images are stacked together to form a three-dimensional volumetric image of the sample S. By moving the sub-pulses along the surface of the sample S using the two-dimensional scanner 140, a three-dimensional volumetric image of at least a portion of the sample S can be generated.

In other implementations, the detection device 160 can be configured to partially demultiplex the plurality of signals from the sample S such that groups of the signals are associated with different output channels, where each output channel is associated with a depth $z_n$ in the sample S. In such implementations, data reproducible as a two-dimensional image is produced for each depth $z_n$ within the sample S, and these images are stacked together to form a three-dimensional volumetric image of the sample S. The two-dimensional images generated during partial demulitplexing differ from those generated during full demultiplexing in that the two-dimensional images are partial extended-depth-of-field ("EDOF") images. By moving the sub-pulses using the two-dimensional scanner 140, a three-dimensional volumetric image of at least a portion of the sample S can be generated.

In still other implementations, the detection device 160 can be configured integrate the signals into a single output channel such that data reproducible as only one two-dimensional image of the sample S is produced at each location. This single two-dimensional image is an extended-depth-of-field ("EDOF") image that corresponds to the projection of all depths $z_n$ within the sample S recorded at once.

Figure 2:
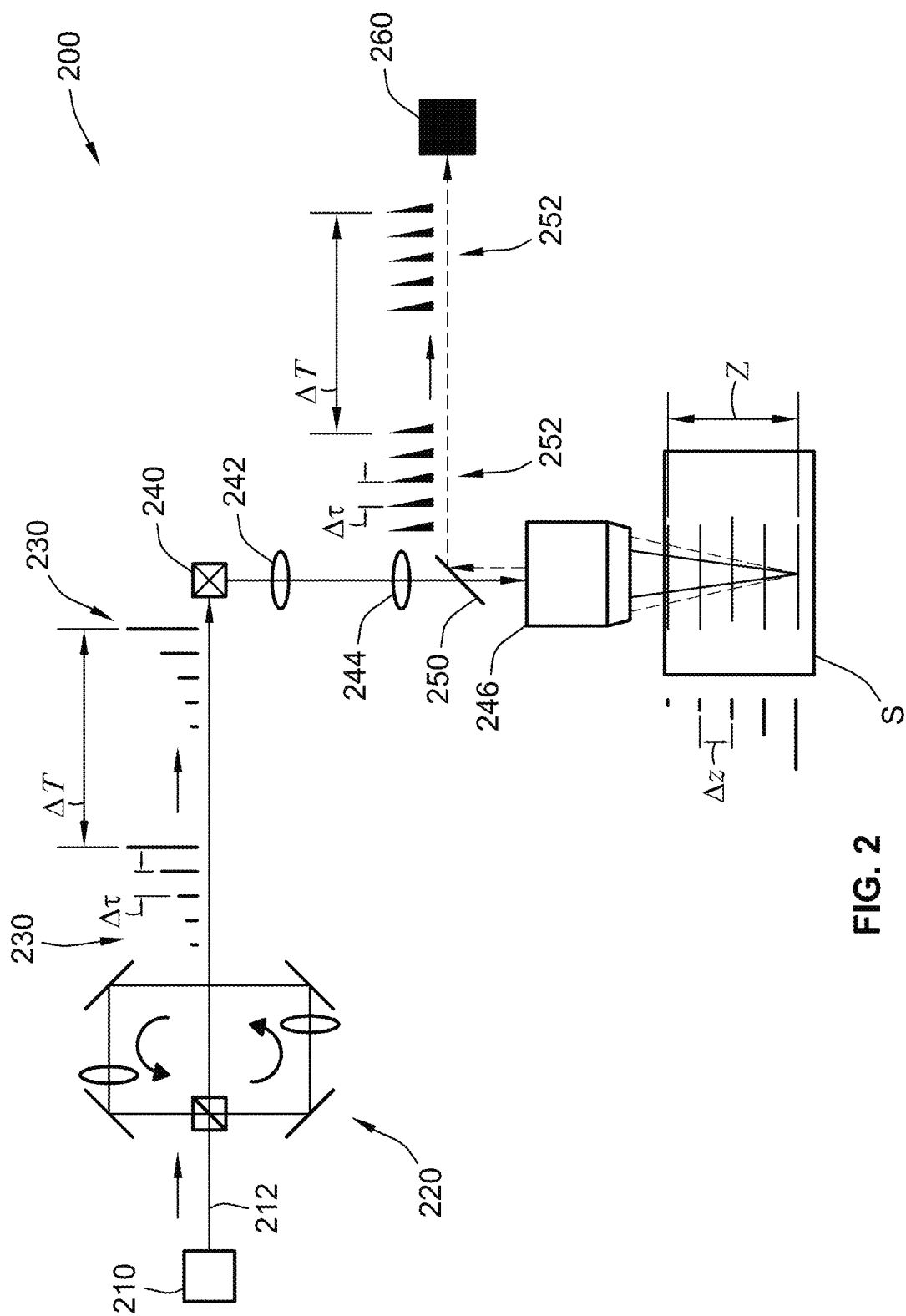
FIG. 2 is a schematic diagram of a scanning microscope system according to some implementations of the present disclosure.

Referring to FIG. 2, a scanning microscope system 200 that is the same as, or similar to, the scanning microscope system 100 described herein includes a laser source 210, a reverberation cavity 220, a two-dimensional scanner 240, a scanning lens 242, a tube lens 244, an objective lens 246, a detection mirror 250, and a detection device 260. Generally, the scanning microscope system 200 is used to quickly obtain one or more volumetric images of a sample S (e.g., biological tissue).

The laser source 210 is the same as, or similar to, the laser source 110 (FIG. 1) described herein and is configured to emit a plurality of laser pulses that are separated from each other by time interval ΔT. As shown, the laser source 210 can emit a first laser pulse 212 that is directed to the reverberation cavity 220.

Like the reverberation cavity 120 (FIG. 1), the reverberation cavity 220 is configured to divide each laser pulse emitted from the laser source 210 (e.g., laser pulse 212) into a plurality of sequential sub-pulses 230. More specifically, and as described in further detail herein, the reverberation cavity 220 is configured such that each sub-pulse in the plurality of sequential sub-pulses 230 is focused to a shallower depth within the sample S than the previous one of the plurality of sequential sub-pulses 230. Each sub-pulse in the plurality of sequential sub-pulses 230 is separated from other sub-pulses by a time interval Δτ.

Figure 3:
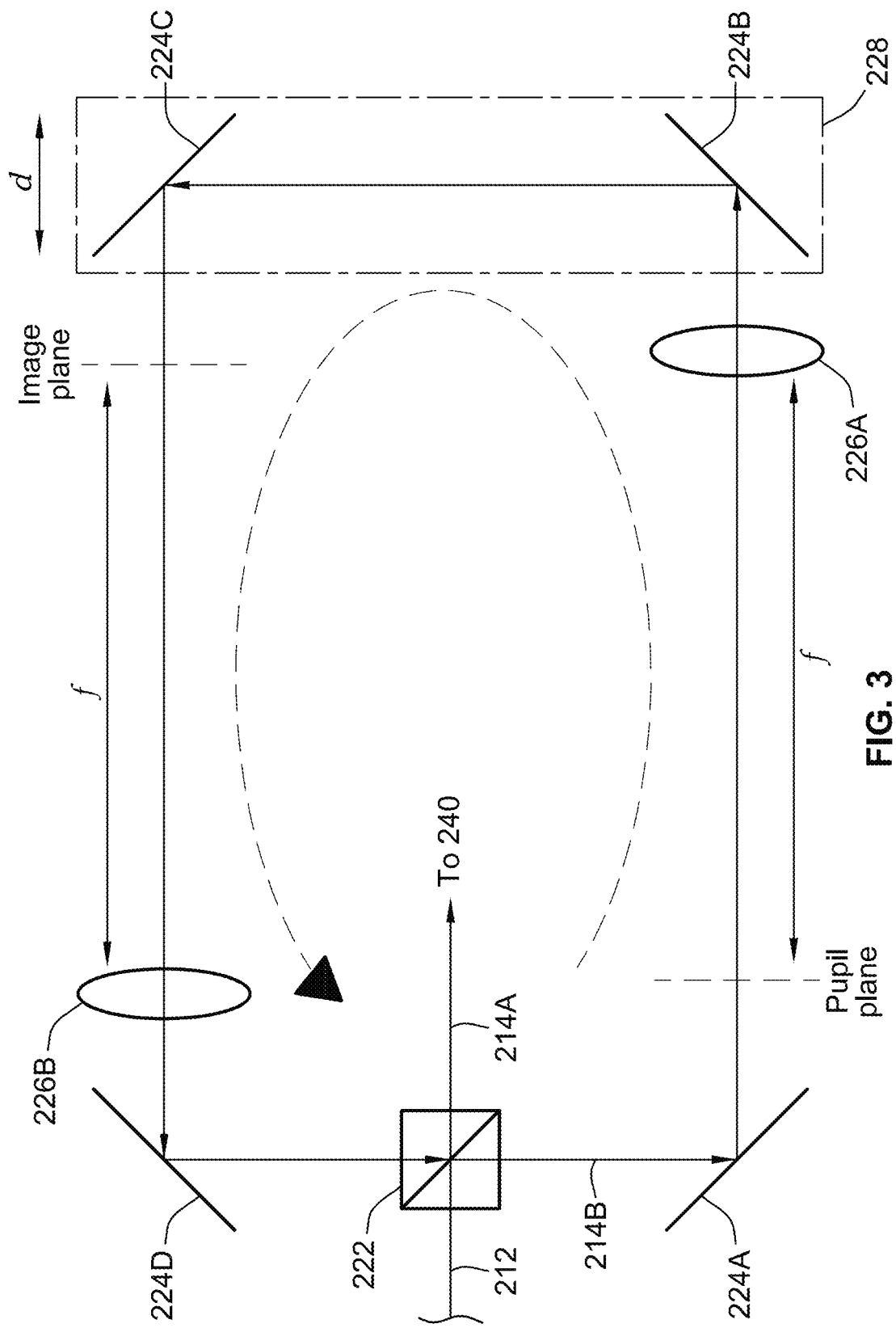
FIG. 3 is a schematic diagram of a reverberation cavity of the scanning microscope system of FIG. 2 according to some implementations of the present disclosure.

Referring to FIG. 3, the reverberation cavity 220 includes a beamsplitter 222, a plurality of mirrors 224A-D, a plurality of lenses 226A-B, and a translation stage 228. The plurality of mirrors 224A-D includes a first mirror 224A, a second mirror 224B, a third mirror 224C, and a fourth mirror 224D. As shown, each of the plurality of mirrors 224A-224D is positioned at an angle that is approximately 45 degrees relative to horizontal and/or 45 degrees relative to the incoming and reflected laser pulse(s).

The plurality of lenses 226A-B includes a first lens 226A and a second lens 226B. The first lens 226A is positioned between the first mirror 224a and the second mirror 224B and has a focal length f. The focal length f of the first lens 226a is the distance between the center of the first lens 226a and the pupil plane. The pupil plane corresponds to a plane conjugate to the two-dimensional scanner 240 (FIG. 2), which is itself conjugate to the pupil of the microscope objective. The second lens 226B is positioned between the fourth mirror 224D and the third mirror 224C and has a focal length f. The focal length f of the second lens 226B is the distance between the center of the second lens 226B and the image plane. The image plane corresponds to a plane conjugate to the deepest focal plane within the sample S (FIG. 2), which as described herein, is the focal plane resulting from the first sub-pulse of the plurality of sequential sub-pulses 230 (FIG. 2). While the focal length f of the first lens 226A has been shown and described herein as the same as the focal length f of the second lens 226B, in other implementations, the focal length of the first lens 226A and the second lens 226B can be different from one another.

The beamsplitter 222 is the same as, or similar to, the beamsplitter 122 (FIG. 1) described herein and is configured to divide the laser pulse 212 emitted from the laser source 210 (FIG. 2) into a first portion 214A and a second portion 214B. The laser pulse 212 has a power P. The beamsplitter 222 has a reflection coefficient of about 0.5 such that the first portion 214a contains half of the laser pulse 212 energy and the second portion 214B contains the other half of the laser pulse 212 energy. In other words, the power of the initial laser pulse 212 is P, the power of the first portion 214a is P/2, and the power of the second portion 214B is also P/2.

The second portion 214B of the laser pulse is reflected onto the first mirror 224A of the reverberation cavity 220. The first mirror 224A then reflects the second portion 214B of the laser pulse through the first lens 226A and onto the second mirror 224B. The second mirror 224B then reflects the second portion 214B of the laser pulse onto the third mirror 224C, which in turn reflects the second portion 214B through the second lens 226b and onto the fourth mirror 224d. Finally, the fourth mirror 224D reflects the second portion 214B of the laser pulse back onto the beamsplitter 222. The beamsplitter 222 then divides the second portion 214B, which has a power of P/2, into two sub-portions, both of which has a power of P/4. The first sub-portion is directed to the two-dimensional scanner 240 and the second sub-portion is redirected through the reverberation cavity 220. In this manner, each of the plurality of sequential sub-pulses 230 passing through the reverberation cavity 220 have a power that is half of the power of the previous one of the plurality of sequential sub-pulses 230 (e.g., the first one of the plurality of sequential sub-pulses has a power of P/4, a second one of the plurality of sequential sub-pulses has a power of P/8, a third of the plurality of sequential sub-pulses has a power of P/16, etc.) In other words, equation 3 above is set equal to 0.5.

With equation 3 set equal to 0.5, $\Delta z$ can be calculated based on the properties of the sample S and the type of microscopy that is employed. In one non-limiting example, if the sample S is brain tissue (where $l_a$ is about 150 microns) and two-photon microscopy (where m=2) is used, according to equation 2, $\Delta z$ is 52 microns. To achieve this $\Delta z$ value, the path length L of the reverberation cavity 220 is changed by adjusting the distance d (e.g., using the translation stage 228).

To adjust the distance d, the second mirror 224B and the third mirror 224c are coupled to the mirror translation stage 228. The mirror translation stage 228 is the same as, or similar to, the mirror translation stage 128 (FIG. 1) described herein. The mirror translation stage 228 can move the second mirror 224B and the third mirror 224C further away from the first mirror 224A and the fourth mirror 224D to increase the distance d. Likewise, the mirror translation stage 228 can move the second mirror 224B and the third mirror 224C closer to the first mirror 224A and the fourth mirror 224D to decrease the distance d. In this manner, the required $\Delta z$ value for the sample S can be obtained.

While the beamsplitter 222 is shown and described herein as being positioned between the first mirror 224A and the fourth mirror 224D, in some implementations, the beamsplitter 222 can be positioned between the second mirror 224B and the fourth mirror 224D. In such implementations, the beamsplitter 222 reflects the second portion 214B of the laser pulse 212 onto the second mirror 224B and the fourth mirror 224D reflects the second portion back onto the beamsplitter 222 after traveling through the plurality of lenses 226.

Figure 4:
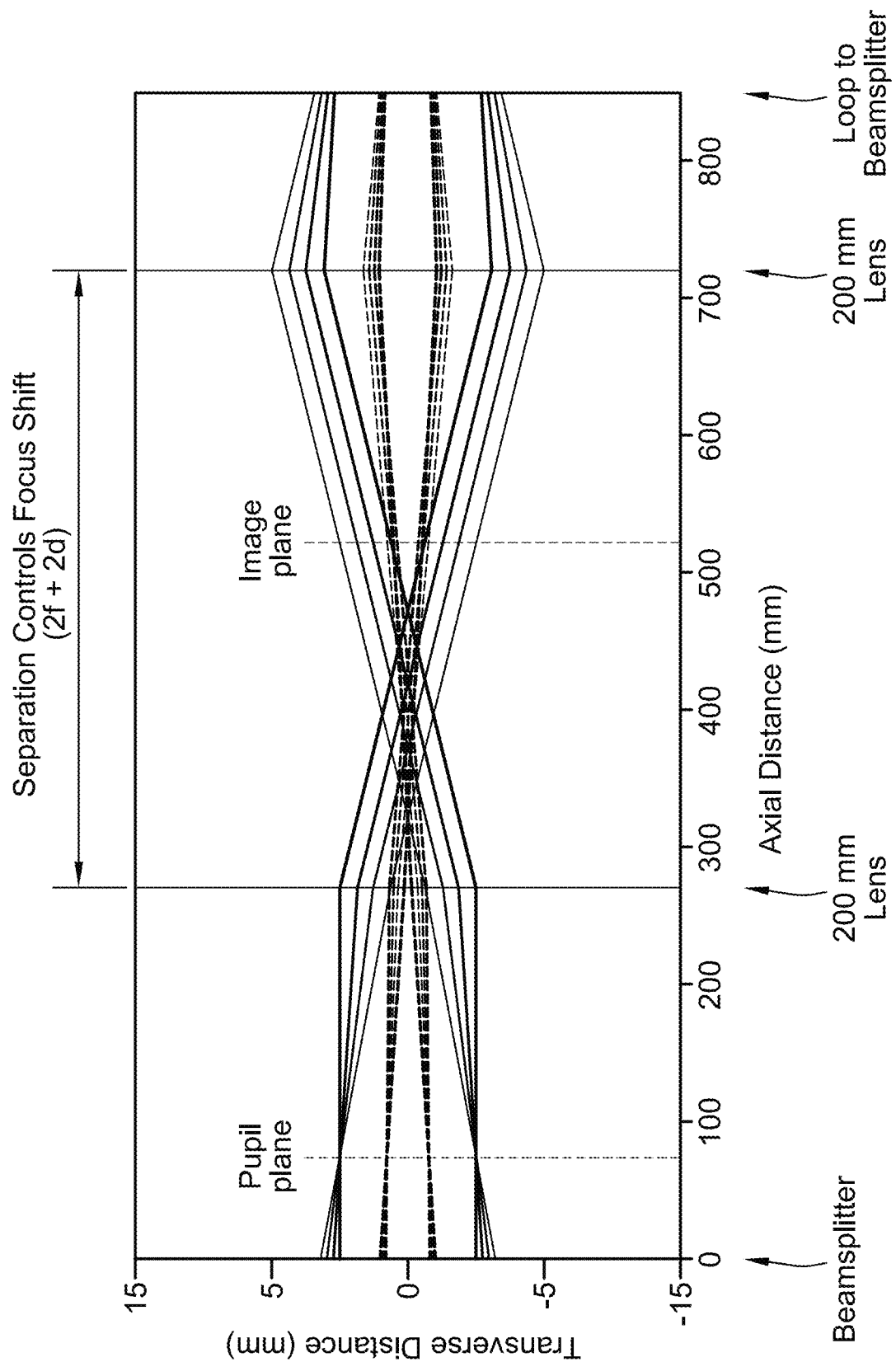
FIG. 4 is an illustration of a path length of a laser pulse traveling through the reverberation cavity of FIG. 3 in one example according to some implementations of the present disclosure.
Figure 5:
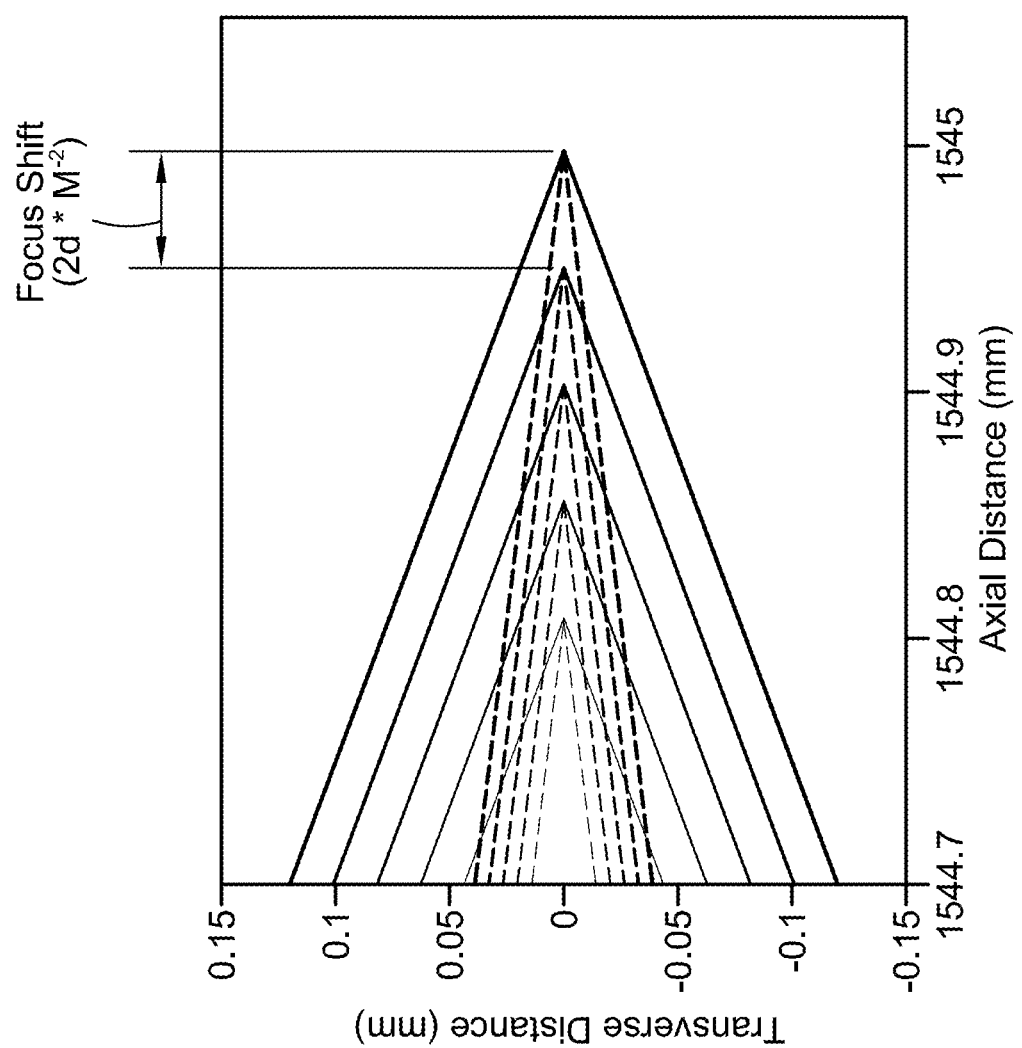
FIG. 5 is an illustration of a path length of a laser pulse traveling through the reverberation cavity of FIG. 3 in one example according to some implementations of the present disclosure.

FIG. 4 illustrates the path length L of a laser pulse (or portion of a laser pulse) traveling through the reverberation cavity 220 in one non-limiting example. Exemplary ray traces are shown, where four roundtrips are shown for a set of rays closer to the optical axis and another set of rays are shown farther from the optical axis. In this non-limiting example, the path length L of the reverberation cavity is 850 mm, the distance d is 25 mm, both the focal lengths f are 200 mm, the magnification M from the sample S to the image plane is 32, the pupil plane is located at 70 mm. Further, in this non-limiting example, the distance between the beamsplitter 222 and the two-dimensional scanner 240 is 70 mm and the distance between the second lens 226b and the beamsplitter 222 is also 70 mm. The image plane is located at 520 mm, and the time interval $\Delta \tau$ between each of the plurality of sequential sub-pulses 230 is 2.7 ns. As shown in FIG. 5, $\Delta z$ is defined by $M^2 \times 2d$, where $\Delta z$ can be adjusted by moving the second mirror 224b and the third mirror 224c using the translation stage 228 (FIG. 2).

After the plurality of sequential sub-pulses 230 pass through the scanning lens 242, the tube lens 244, and the objective lens 246 onto the sample S, a plurality of fluorescence sub-signals 252 are generated. Each plurality of fluorescence sub-signals 252 is associated with a plurality of sequential sub-pulses 232. Each of the fluorescence sub-signals within one of the plurality of fluorescence signals 252 are separated by time interval $\Delta \tau$, and each plurality of fluorescence signals 252 is separated by time interval $\Delta T$. In certain aspects, the plurality of sequential sub-pulses 230 may have a red color and the plurality of fluorescence sub-signals 252 may have a green color.

The detection mirror 250 is the same as, or similar to, the detection mirror 150 (FIG. 1) described herein. Specifically, as shown in FIG. 2, the detection mirror 250 is positioned above the sample S at an angle that is about 45 degrees relative to horizontal and/or the laser pulse(s) being directed onto or reflected from the detection mirror 250. The detection mirror 250 is a dichromatic mirror that is configured to transmit one color and reflect another color to separate out the florescence signals (e.g., having a green color) from the laser sub-pulses (e.g., having a red color). Thus, the detection mirror 250 can parse the plurality of fluorescence signals 252 (green) from the plurality of sequential sub-pulses 230 (red). The detection mirror 250 directs these parsed fluorescence signals to the detection device 260 for detection and processing.

Figure 7:
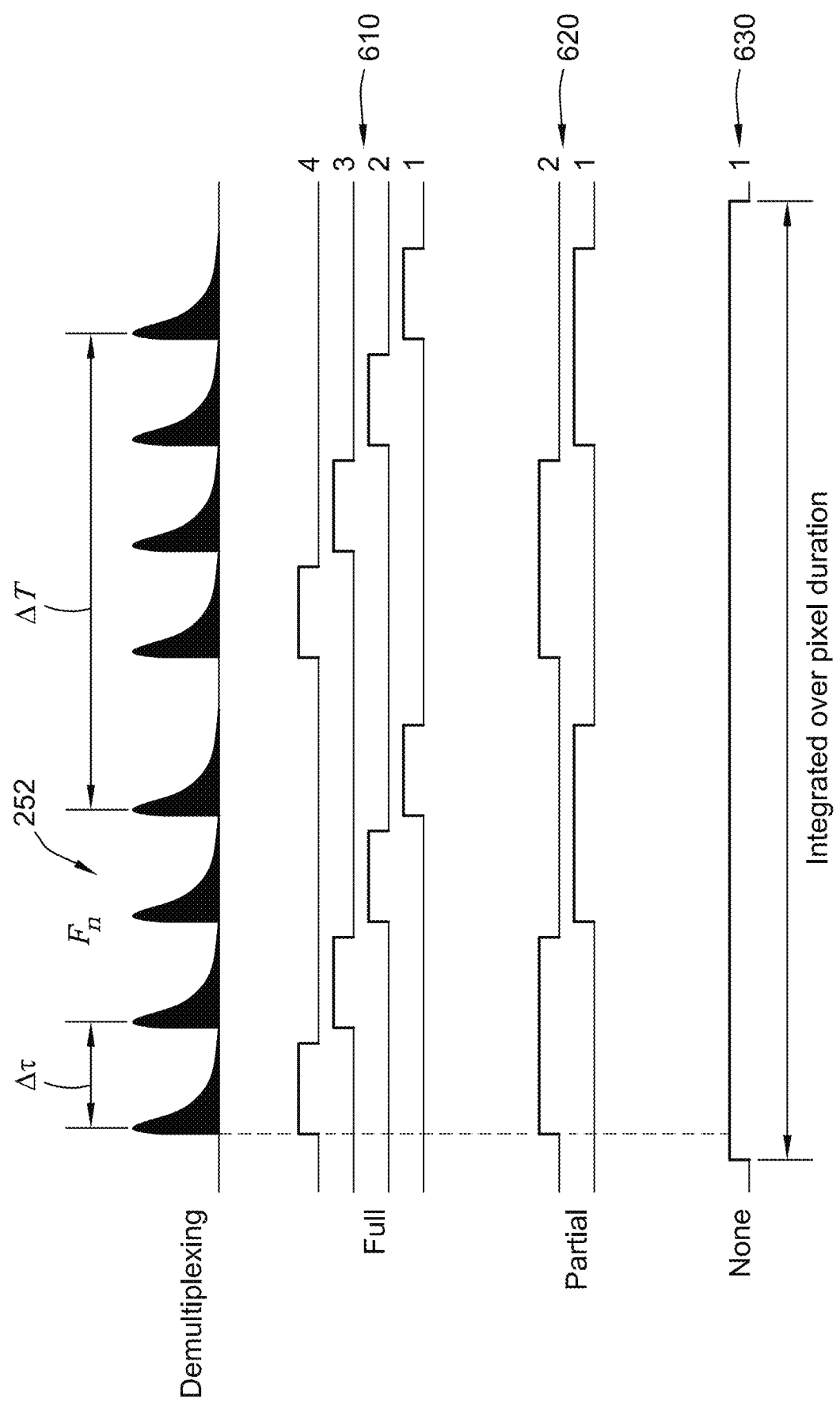
FIG. 7 is a schematic representation of signal processing methods according to some implementations of the present disclosure.

The detection device 260 is the same as, or similar to, the detection device 160 described herein. In some implementations, the detection device 260 is configured to fully demultiplex the plurality of signals from the sample S such that each of the plurality of signals is associated with a different one of a plurality of output channels. Referring to FIG. 7, in such implementations, each of fluorescence signals are parsed into a different output channel 610, where each output channel is associated with a corresponding depth $z_n$. For example, each plurality of fluorescence signals includes four sub-signals, and each of these four sub-signals is associated with one of four output channels 610 of the demulitplexer.

In such implementations where the detection device 260 fully demultiplexes the fluorescence signals, the microscope system 200 generates a stack of two-dimensional images of a location on the surface of the sample S containing an array of pixel values from each of the plurality of output channels. As the laser source 210 emits a plurality of laser pulses and the reverberation cavity 220 generates a plurality of sequential sub-pulses 230 for each laser pulse, the two-dimensional scanner 240 moves along the surface of the sample S, producing stacks of two-dimensional images, which can be combined to generate a three-dimensional volumetric image of the sample S.

Alternatively, in some implementations, the detection device 260 is configured to partially demultiplex the plurality of signals from the sample S such that groups of the plurality of signals are associated with a plurality of output channels. Referring to FIG. 7, in such implementations, a group of fluorescence signals (e.g., a plurality of fluorescence signals) are parsed each output channel 620, where each output channel is associated with a corresponding depth $z_n$. For example, each plurality of fluorescence signals includes four signals, and a first group of two of the four signals is associated with a first one of the output channels 620 and a second group of two of the four signals is associated with a second one of the output channels 620.

In such implementations where the detection device 260 partially demultiplexes the fluorescence signals, the microscope system 200 generates two-dimensional images of a location on the surface of the sample S containing an array of pixel values from each of the plurality of output channels. As the laser source 210 emits a plurality of laser pulses and the reverberation cavity 220 generates a plurality of sequential sub-pulses 230 for each laser pulse, the two-dimensional scanner 240 moves along the surface of the sample S, producing stacks of two-dimensional images, which can be combined to generate a three-dimensional volumetric image of the sample S. Partial demultiplexing differs from full demultiplexing in that the stacks of two-dimensional images are stacks of partial extended-depth-of-field ("EDOF") images.

For both full and partial demultiplexing of the signals, each plurality (group) of fluorescence signals 252 produced by one plurality of sequential sub-pulses 230 cannot overlap with the next group. In other words, a first plurality of fluorescence signals 252 generated from a first plurality of sequential sub-pulses 230 terminates before a second plurality of fluorescence signals 252 are generated from a second plurality of sequential sub-pulses 230. Accordingly, the maximum imaging depth Z is defined according to according equation 9 below:

$$Z_{max} = \Delta z \times \frac{\Delta T}{\Delta \tau} \qquad \text{Equation 9}$$

This means that there is a constraint on the frequency (repetition rate R) of the laser source 210. For example, typical fluorescence signal lifetimes are on the order of few nanoseconds, meaning that $\Delta \tau$ is preferably a few nanoseconds (e.g., at least two nanoseconds) to permit full demultiplexing of the fluorescence signals. For example, if $\Delta \tau$ is 5 nanoseconds and $\Delta z$ is 50 microns, a 100 MHz frequency of the laser source 210 permits a maximum penetration depth (Z) of about 100 microns. For greater sample penetration (greater Z values), slower laser source 210 frequencies are preferred (e.g., a 10 MHz frequency provides for a depth penetration (Z) of 1 millimeter, which generally corresponds to the maximum multiphoton depth penetrations in biological tissue). As such, partial demultiplexing implementations allow for smaller $\Delta \tau$ and hence greater depth penetration (Z).

In other implementations, the detection device 260 does not fully or partially demultiplex the plurality of fluorescence signals 252 generated from the sample S. Instead, in such implementations, the detection devices 260 integrates each of the plurality of fluorescence signals 252 into a single output channel 630 and only one two-dimensional image of the sample S is produced at each location. This single two-dimensional image is an extended-depth-of-field ("EDOF") image that corresponds to the projection of all depths $z_n$ within the sample S recorded at once.

Figure 6A:
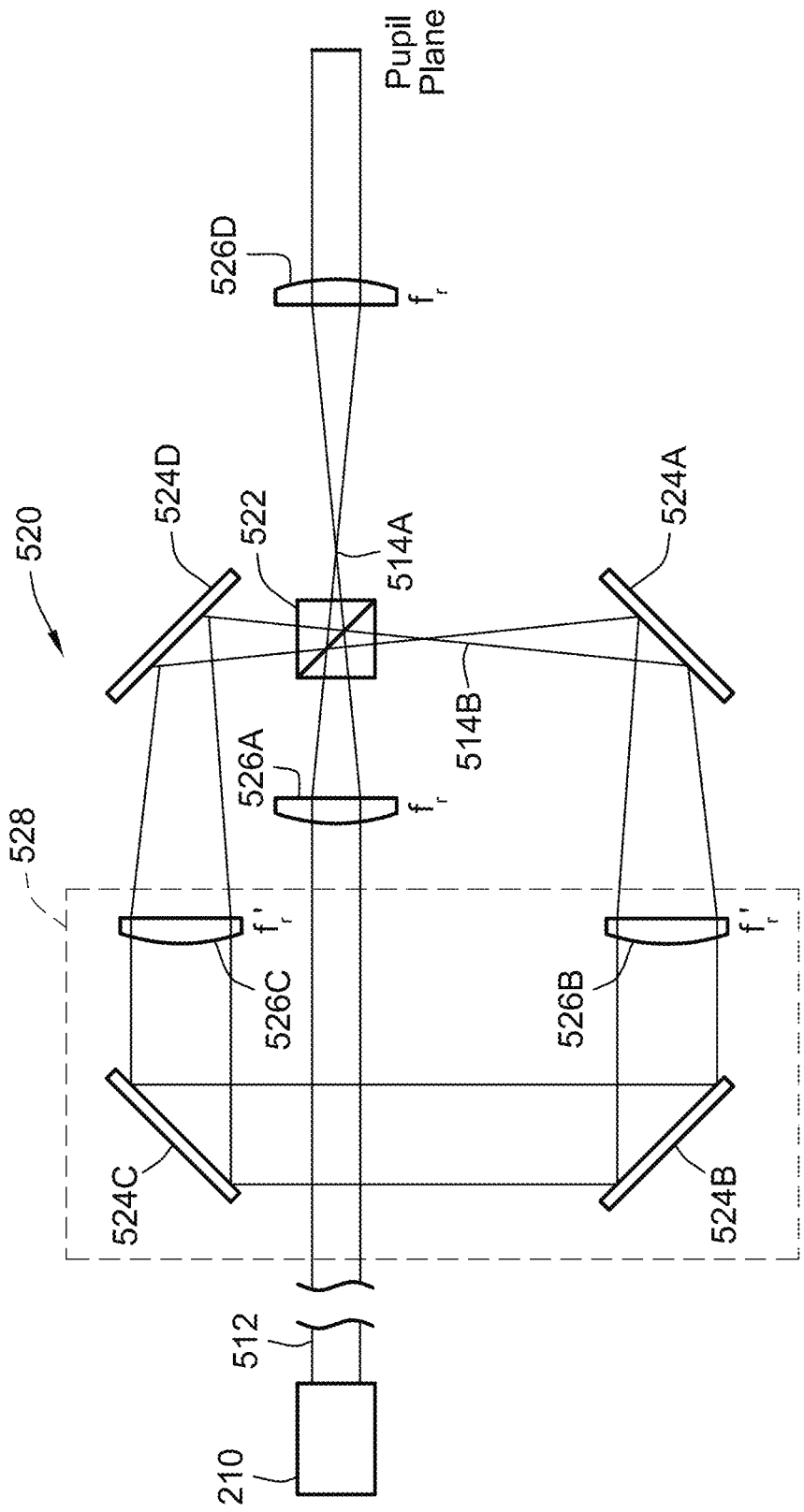
FIG. 6A is a schematic diagram of a reverberation cavity of the scanning microscope system of FIG. 2 according to some implementations of the present disclosure.

Referring to FIG. 6A, an alternative reverberation cavity 520 that can be used with the scanning microscope system 200 (FIG. 2) instead of the reverberation cavity 220 (FIG. 3) is illustrated. Like the reverberation cavity 120 (FIG. 1), the reverberation cavity 520 is configured to divide each laser pulse (e.g., laser pulse 252, which is the same as, or similar to, the laser pulse 212) from the laser source 210 (FIG. 2) into a plurality of sequential sub-pulses. As described herein, each sequential sub-pulse is focused to shallower depth within the sample S than the previous sub-pulse. The reverberation cavity 520 includes a beamsplitter 522, a plurality of mirrors 524A-524D, a plurality of lenses 526A-526D, and a mirror translation stage 528.

The beamsplitter 522 is the same as, or similar to, the beamsplitter 222 described herein (FIG. 3). Similarly, the mirror translation stage 528 is the same as, or similar to, the translation stage 228 described herein (FIG. 3). The plurality of mirrors 524A-524D and the plurality of lenses 526A-526D are the same as, or similar to, the plurality of mirrors 224A-D and the plurality of lenses 226A-B, respectively, of the reverberation cavity 220 (FIG. 3). The reverberation cavity 520 is arranged such that a first lens 526A is positioned between the laser source 210 (FIG. 2) and the beamsplitter 522, a second lens 526B is positioned between a first mirror 524A and a second mirror 524B, a third lens 526C is positioned between a third mirror 524C and a fourth mirror 524D, and a fourth lens 526D is positioned between the beamsplitter 522 and the pupil plane.

Similar to the reverberation cavity 220 described herein, the beamsplitter 522 divides the laser pulse 512 into the first portion 514A and a second portion 514B. The beamsplitter 522 has a reflection coefficient of about 0.5 such that the first portion 514A contains half of the laser pulse 512 energy and the second portion 514B contains the other half of the laser pulse 512 energy. In other words, the power of the initial laser pulse 512 is P, the power of the first portion 514A is P/2, and the power of the second portion 514B is also P/2. The second portion 514B is directed onto the first mirror 524A, which in turn directs the second portion 514B through the second lens 526B and onto the second mirror 524B. The second mirror 524B then directs the second portion 514B onto the third mirror 524C, which in turn directs the second portion 514B through the third lens 526C and onto the fourth mirror 524D. Finally, the fourth mirror 524D reflects the second portion 514B of the laser pulse back onto the beamsplitter 522. The beamsplitter 522 then divides the second portion 514B, which has a power of P/2, into two sub-portions, both of which has a power of P/4. In this manner, each of the plurality of sequential sub-pulses passing through the reverberation cavity 520 have a power that is half of the power of the previous one of the plurality of sequential sub-pulses (e.g., the first one of the plurality of sequential sub-pulses has a power of P/4, a second one of the plurality of sequential sub-pulses has a power of P/8, a third of the plurality of sequential sub-pulses has a power of P/16, etc.) In other words, equation 3 above is set equal to 0.5.

Figure 6B:
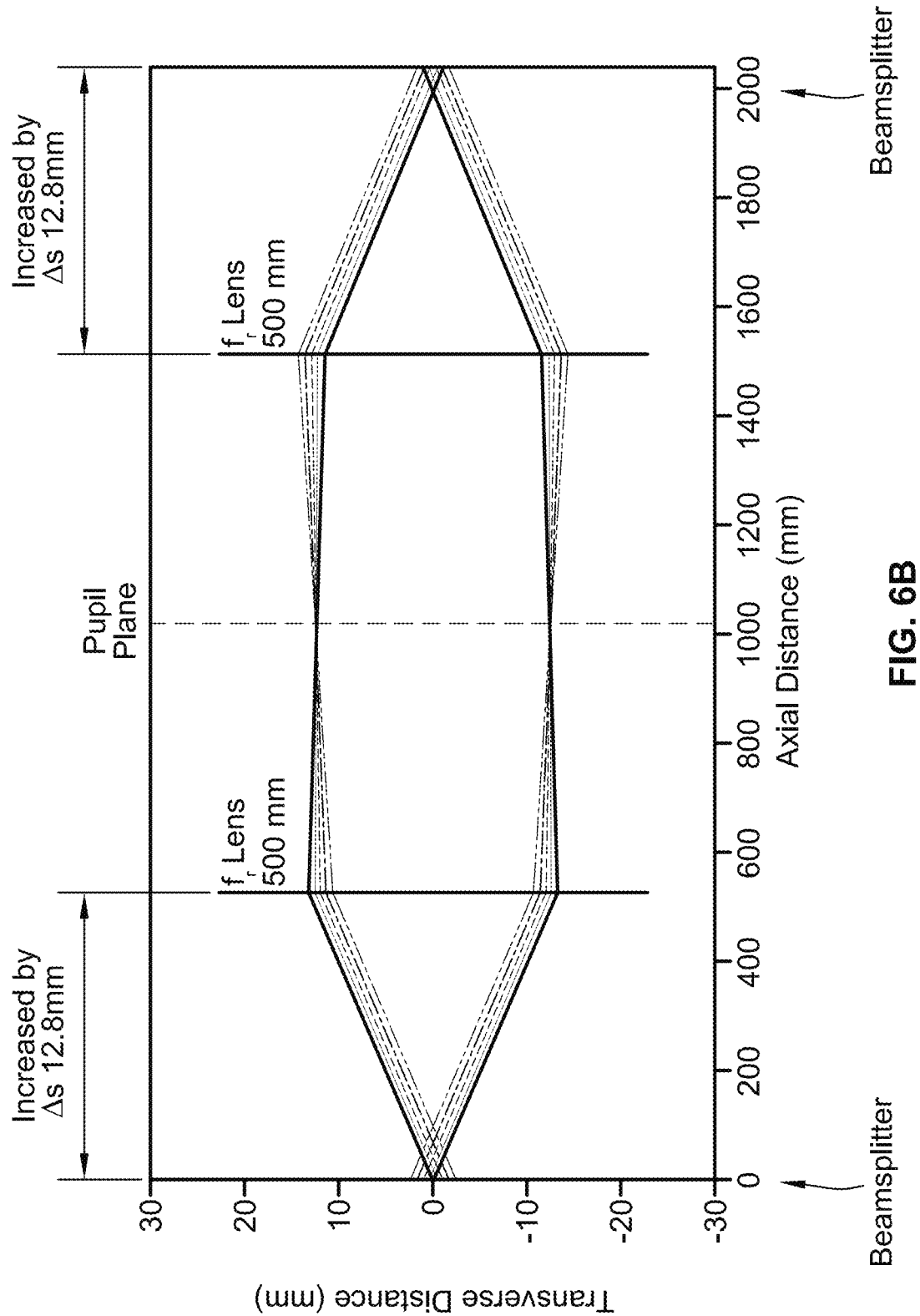
FIG. 6B is an illustration of a path length of a laser pulse traveling through the reverberation cavity of FIG. 6A in one example according to some implementations of the present disclosure.

Referring to FIG. 6B, ray traces of a laser pulse (or a portion of a laser pulse) traveling through the reverberation cavity 520 of FIG. 6A in one non-limiting example is illustrated. Five roundtrips through the reverberation cavity 520 are shown. In this example, the focal length of the second lens 526B and the third lens 526C is 500 mm. Further, in this example, the distance between the beamsplitter 522 and the second lens 526B is 12.8 mm. The total distance of one loop through the reverberation cavity 520 in this example is about 2000 mm.

Figure 8B:
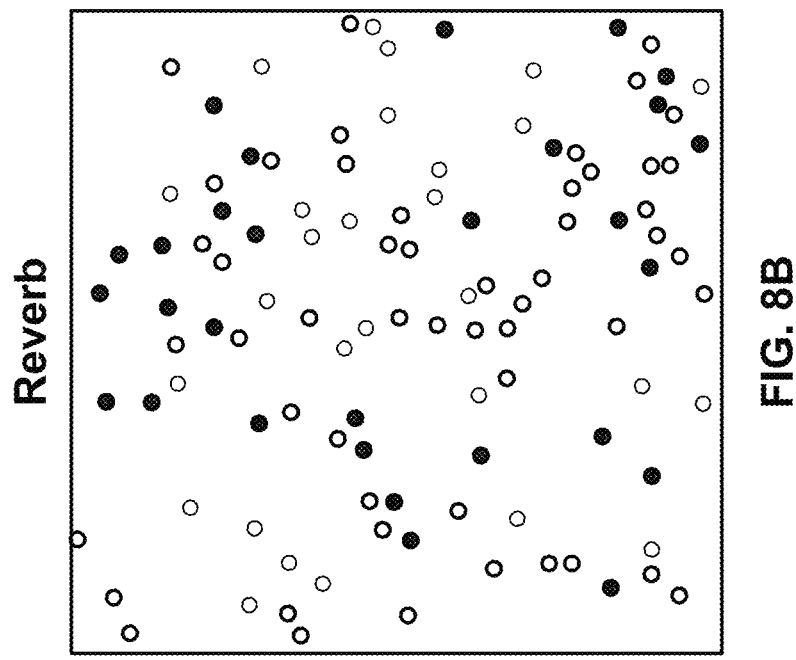
FIG. 8B is an exemplary image of a sample taken using a microscope system including a reverberation cavity according to some implementations of the present disclosure.
Figure 8A:
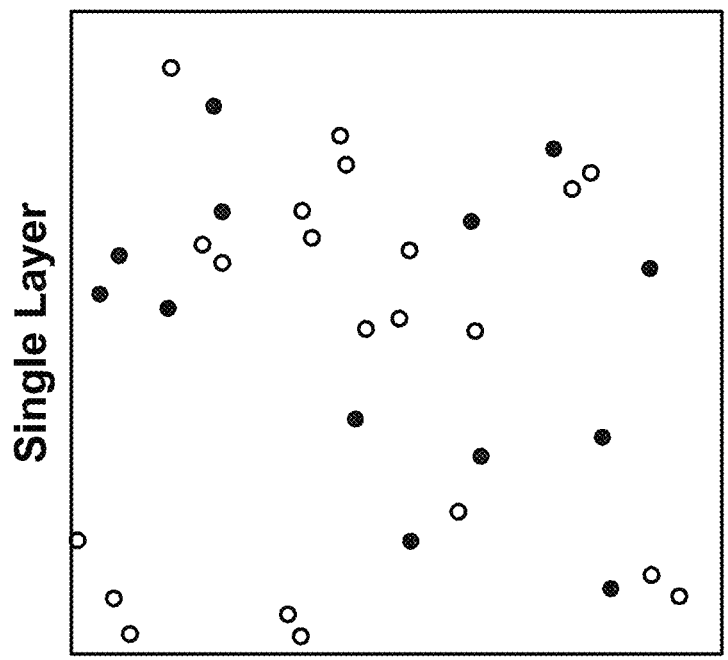
FIG. 8A is an exemplary image of a sample taken using a microscope system not including a reverberation cavity.

Referring to FIGS. 8A and 8B, a comparison of images obtained with and without a reverberation cavity, such as the reverberation cavity 220 described herein, is shown. FIG. 8A illustrates an image from a microscope system that is the same as, or similar to, the microscope system 200 (FIG. 2) described herein but not including the reverberation cavity 220. FIG. 8B illustrates an image from a microscope system that is the same, or similar to, the microscope system 200 (FIG. 2) described herein, including the reverberation cavity 220. As shown, FIG. 8B provides more detail of the sample than the image of FIG. 8A.

Referring to FIGS. 9A and 9B, another comparison of images obtained with and without a reverberation cavity, such as the reverberation cavity 220 described herein, is shown. FIG. 9A illustrates images from a microscope system not including a reverberation cavity, where the images were generated by summing a plurality of two-dimensional images taken at different depths. FIG. 9B illustrates images from a microscope system that is the same, or similar to, the microscope system 200 (FIG. 2) described herein, including the reverberation cavity 220. As shown by a comparison of FIGS. 9A and 9B, the reverberation cavity microscope system images (FIG. 8B) have at least the same quality as the microscope system used to generate the images illustrated in FIG. 9A, but the images illustrated in FIG. 9B can be generated far more quickly than the images in FIG. 9A.

Figure 10:
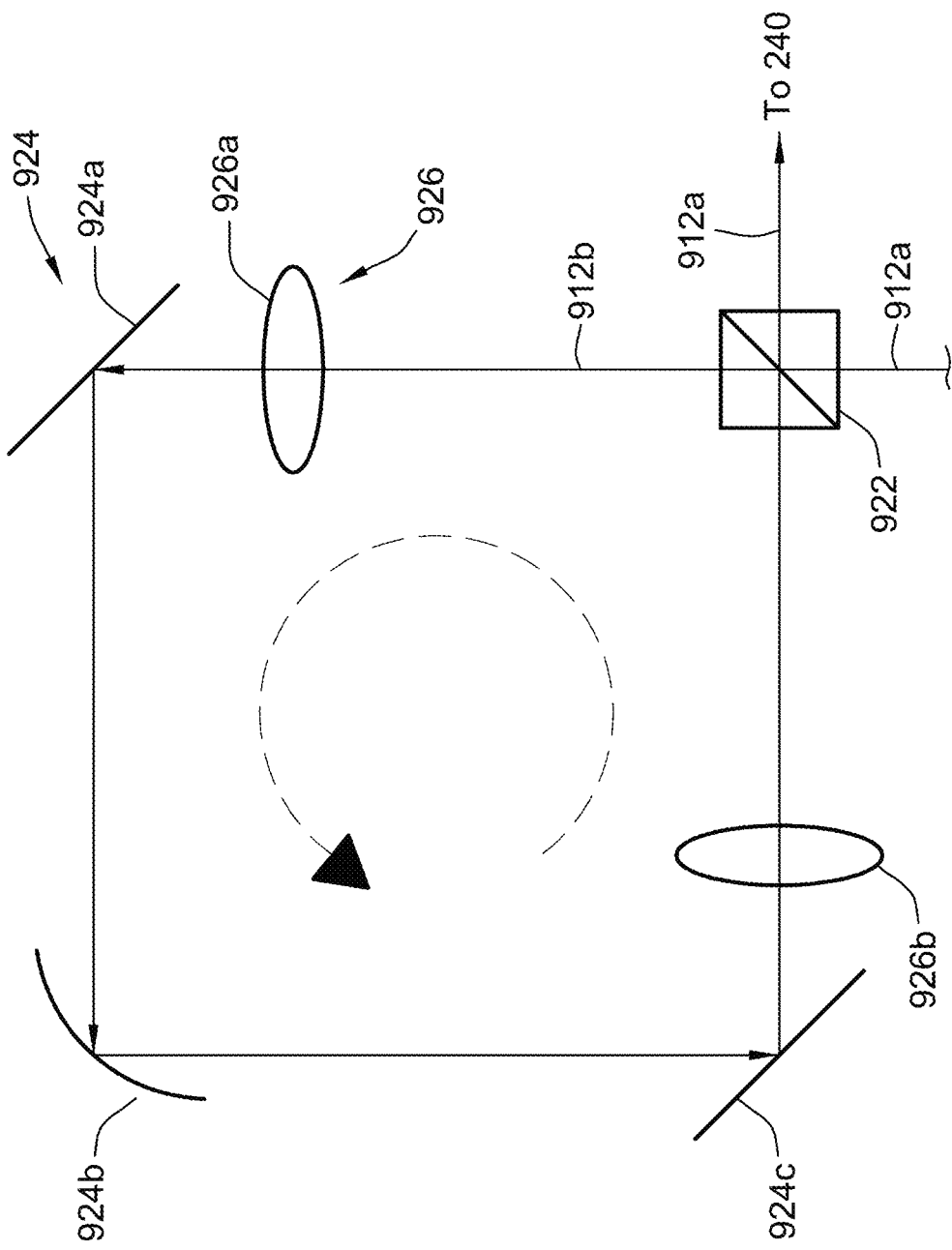
FIG. 10 is a schematic diagram of a reverberation cavity including a mirror with an adjustable curvature according to some implementations of the present disclosure.

Referring to FIG. 10, another exemplary reverberation cavity 920 that is similar to the reverberation cavity 120 (FIG. 1) and the reverberation cavity 220 (FIG. 2) includes a beamsplitter 922, a plurality of mirrors 924, and a plurality of lenses 926. The reverberation cavity 920 can be used with a microscope system that is otherwise the same as, or similar to, the microscope system 200 (FIG. 2) described herein and is used to generate a plurality of sequential sub-pulses from each laser pulse emitted from a laser source (e.g., the laser source 210 shown in FIG. 2).

The beamsplitter 922 is the same as, or similar to, the beamsplitter 122 (FIG. 1) and the beamsplitter 222 (FIG. 2) described herein. As shown, the beamsplitter 922 divides a laser pulse 912 into a first portion 912a that is reflected to a two-dimensional scanner (e.g., the two-dimensional scanner 240 shown in FIG. 2) and a second portion 912b that is directed into the reverberation cavity 920.

The plurality of mirrors 924 includes a first mirror 924a, a second mirror 924b, and a third mirror 924c. The first mirror 924a and the second mirror 924b are the same as, or similar to, each of the plurality of mirrors 224 of the microscope system 200 described herein. The second mirror 924b is located in a pupil plane of the microscope and differs from each of the plurality of mirrors 224 (FIG. 2) in that the second mirror 924b has an adjustable curvature. A curvature adjustment of the second mirror 924b causes a change in its focal length f. For example, the second mirror 924b can be a deformable mirror, where deformation of the mirror causes a change in focal length. In some implementations, the deformable mirror can include one or more motors and/or actuators, for example, that are configured to adjust the curvature of the mirror.

The plurality of lenses 926 includes a first lens 926a that is positioned between the beamsplitter 922 and the first mirror 924a and a second lens 926b that is positioned between the third mirror 924c and the beamsplitter 922. The first lens 926a and the second lens 926b are the same as, or similar to, the first lens 226a and the second lens 226b (FIG. 2) described herein.

As described herein, $\Delta z$ is a function of the focal length of the curvature of the second mirror 924b. Thus, advantageously, as compared to the reverberation cavity 220 (FIG. 2), the relative positions the plurality of mirrors 924 do not need to be moved (e.g., using the translation stage 228) to adjust the path length L of the reverberation cavity 920. Instead, the curvature of the second mirror 924b is adjusted to change its focal length, and thus $\Delta z$.

Figure 11:
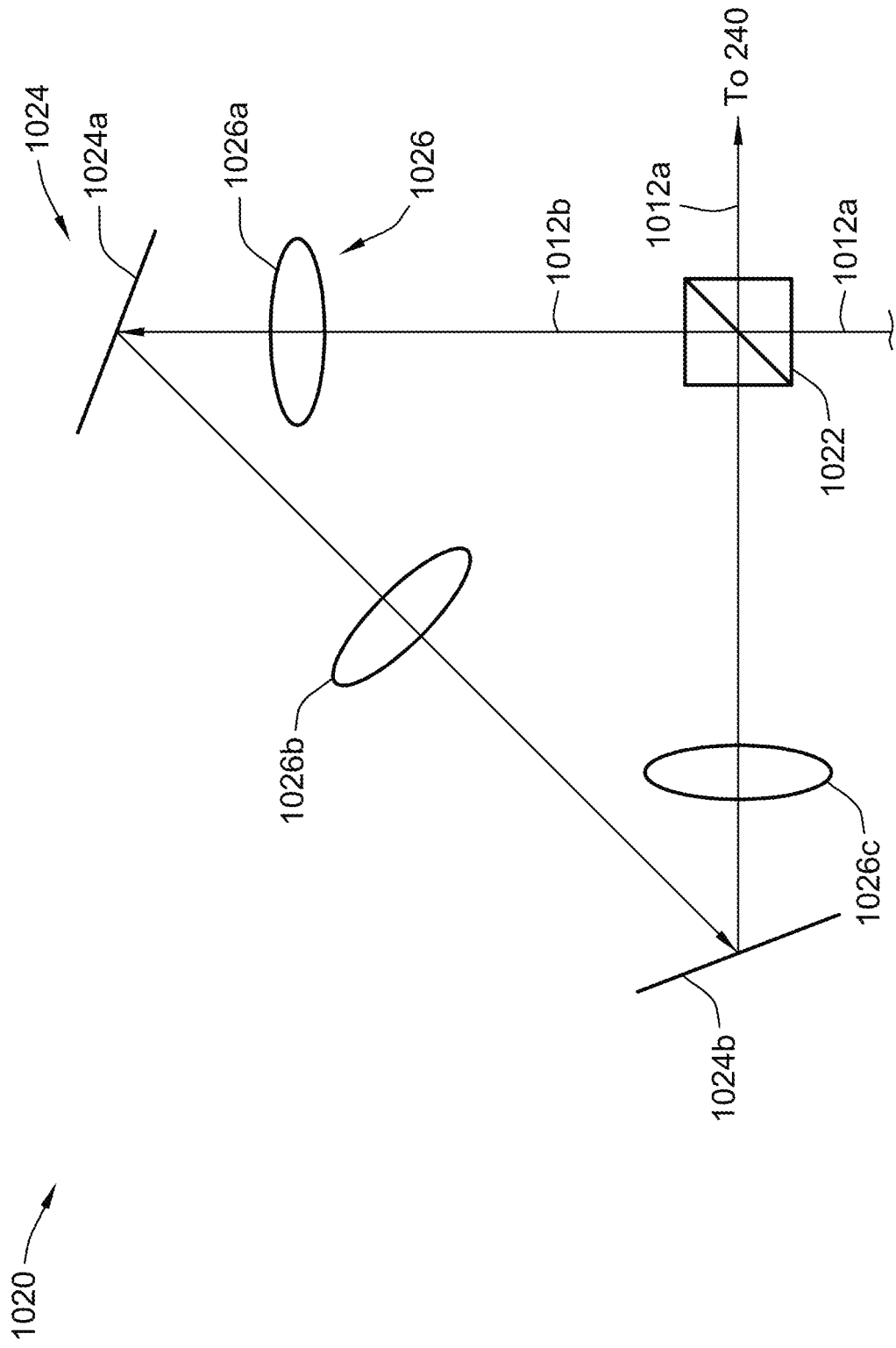
FIG. 11 is a schematic diagram of a reverberation cavity including a lens with an adjustable focal length according to some implementations of the present disclosure.

Referring to FIG. 11, yet another exemplary reverberation cavity 1020 that is similar to the reverberation cavity 120 (FIG. 1), the reverberation cavity 220 (FIG. 2), and the reverberation cavity 920 (FIG. 9) includes a beamsplitter 1022, a plurality of mirrors 1024, and a plurality of lenses 1026. The reverberation cavity 1020 can be used with a microscope system that is otherwise the same as, or similar to, the microscope system 200 (FIG. 2) described herein.

The beamsplitter 1022 is the same as, or similar to, the beamsplitter 122 (FIG. 1) and the beamsplitter 222 (FIG. 2) described herein. As shown, the beamsplitter 1022 divides a laser pulse 1012 into a first portion 1012a that is reflected to a two-dimensional scanner (e.g., the two-dimensional scanner 240 shown in FIG. 2) and a second portion 1012b that is directed into the reverberation cavity 1020.

The plurality of mirrors 1024 includes a first mirror 1024a and a second mirror 1024b. The first mirror 1024a and the second mirror 1024b are the same as, or similar to, each of the plurality of mirrors 224 of the microscope system 200 described herein. The plurality of lenses 1026 includes a first lens 126a that is positioned between the beamsplitter 1022 and the first mirror 1024a, a second lens 126b that is positioned between the first mirror 1024b and the second mirror 1024b, and a third lens 126c that is positioned between the second mirror 1024b and the beamsplitter 1022. The first lens 1026a and the third lens 1026c are the same as, or similar to, the first lens 226a and the second lens 226b (FIG. 2) described herein. The second lens 1026b is located in a pupil plane of the microscope and differs from the first lens 226a and the second lens 226b in that the second lens 1026b has an adjustable focal length. For example, in some implementations, the second lens 1026b is an electrically tunable-lens with an adjustable focal length f.

As described herein, Δz is a function of the focal length of the second lens 1026b of the reverberation cavity 1020. Thus, advantageously, as compared to the reverberation cavity 220 (FIG. 2), none of the plurality of mirrors 1024 need to be moved (e.g., using the translation stage 228) to adjust the path length L of the reverberation cavity 1020. Instead, the focal length of the second lens 1026b is adjusted to change Δz.

The reverberation cavity (e.g., the reverberation cavity 220, the reverberation cavity 520, the reverberation cavity 920, the reverberation cavity 1020, or the reverberation cavity 1220) itself may introduce optical dispersion in the illumination path, which cumulatively amplifies upon each reverberation pass. In some implementations of reverberation cavities described herein, an intra-loop optical element is included to counteract this dispersion. Examples of such an intra-loop optical element are a diffractive optical element, a dispersion compensator, or a chirped mirror.

The reverberation cavity itself may introduce aberrations in the illumination path, which cumulatively amplify upon each reverberation pass. In some implementations of reverberation microscopy, an intra-loop optical element may be used to counteract these aberrations. Examples of such an intra-loop optical element include a diffractive optical element, an aberration compensator, a deformable mirror, a spatial light modulator, or any combination thereof.

The microscope objective itself may also introduce aberrations that become amplified the farther the reverberation focus is from the nominal working distance of the objective. In some implementations of the systems described herein, an intra-loop optical element may be used to counteract these objective-induced aberrations. Examples of such an intra-loop optical element include a diffractive optical element, an aberration compensator, a deformable mirror, a spatial light modulator, or any combination thereof.

In some implementations, the microscopy systems described herein can include a plurality of cavities within the illumination path to interleave more than one reverberation sub-pulse sequence. Additional cavities can reduce the spacing between reverberation planes. For example, such implementations can make use of pulse-splitting cavities that are upstream, downstream, or embedded within the reverberation cavity.

Figure 12:
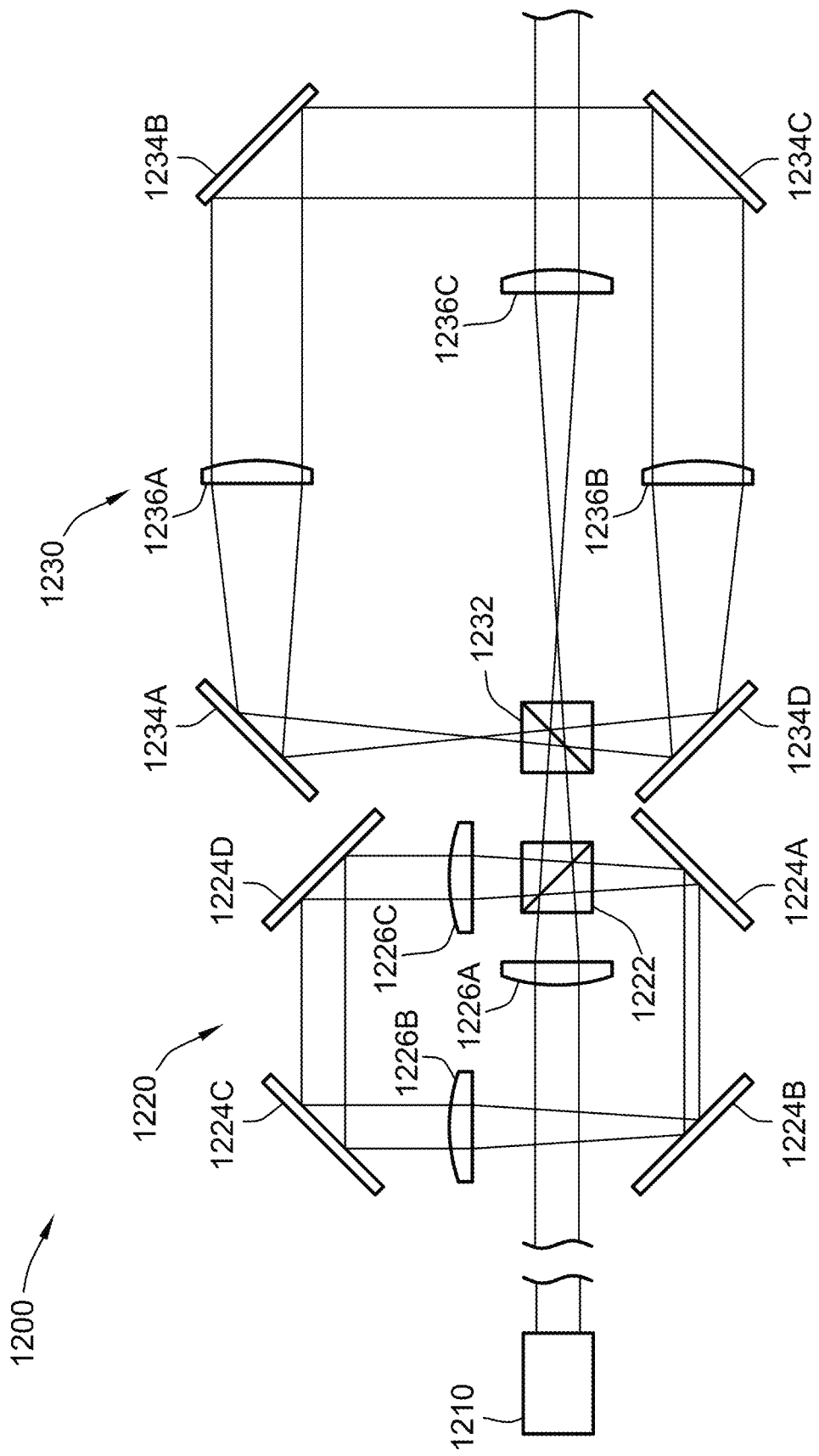
FIG. 12 is a schematic diagram of a microscope system including a plurality of cavities according to some implementations of the present disclosure.

Referring to FIG. 12, a microscope system 1200 includes a first cavity 1220 and a second cavity 1230. The illumination (e.g., laser pulse from laser source 1210) is first split into two sub-pulses using the first cavity 1220, and each of these two sub-pulses then enters the same downstream reverberation cavity 1230. In this manner, two reverberation sub-pulse sequences are created that are temporally offset from one another by the time delay from the first cavity 1220, with each sub-pulse sequence being focused to interleaved depths within the sample.

The first cavity 1220 includes a beamsplitter 1222, a plurality of mirrors 1224A-1224D, and a plurality of lenses 126A-126C. The beamsplitter 1222 is a polarizing beamsplitter. The beamsplitter 1222 splits incident light (e.g., laser pulses) that passes through the first lens 1226A into a first portion that travels towards the second cavity 1230 and a second portion that is directed to the first mirror 1224A. The first mirror 1224A directs the second portion towards the second mirror 1224B, which directs the second portion through the second lens 1226B and onto the third mirror 1224C, which directs the second portion onto the fourth mirror 1224D, which in turn directs the light through the third lens 1226C and back to the beginning of the loop at the beamsplitter 1222.

The second cavity 1230 includes a beamsplitter 1232, a plurality of mirrors 134A-134D, and a plurality of mirrors 1236A-1236D. The beamsplitter 1232 is a non-polarizing beamsplitter. The beamsplitter 1232 splits incident light (e.g., laser pulses) that is directed out of the first cavity 1220 into a first portion that continues out of the second cavity 1230 and a second portion that is directed onto the first mirror 1234A. The first portion of the light that is directed out of the second cavity 1230 passes through the third lens 1236C. The first mirror 1234A directs the second portion through the first lens 1236A and onto the second mirror 1234B, which directs the second portion onto the third mirror 1234C, which directs the second portion through the second lens 1236B and onto the fourth mirror 1234D. The four mirror 1234D then directs the second portion back onto the beamsplitter 1232 at the beginning of the loop.

Figure 13A:
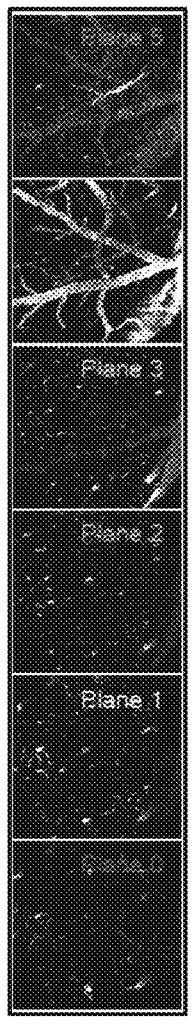
FIG. 13A illustrates images taken at different planes within a sample according to some implementations of the present disclosure.
Figure 13B:
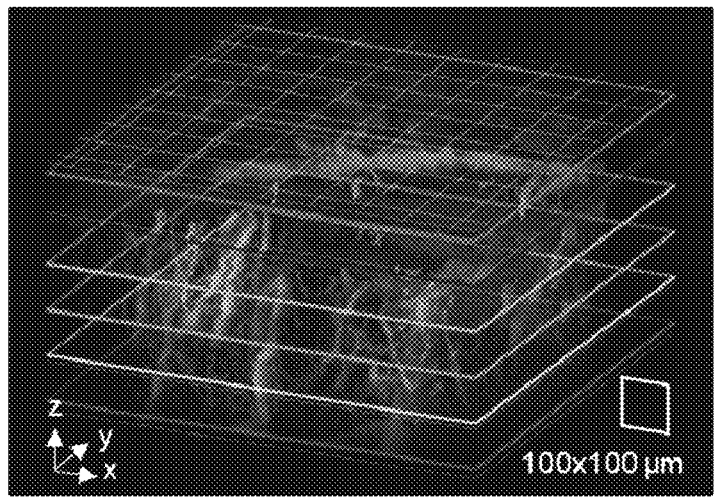
FIG. 13B illustrates the planes of FIG. 13A stacked together according to some implementations of the present disclosure.
Figure 13C:
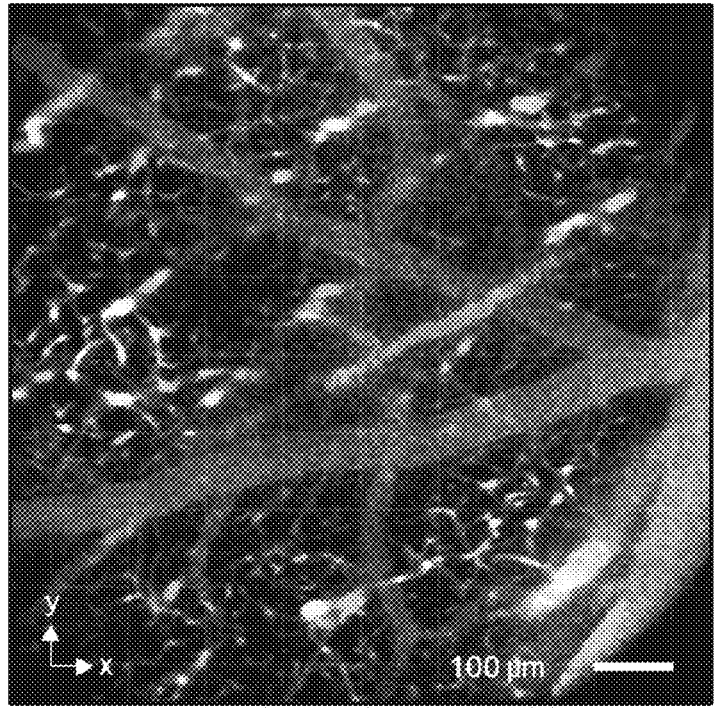
FIG. 13C illustrates the images of FIG. 13A merged together according to some implementations of the present disclosure.

Referring generally to FIGS. 13A-13C, exemplary images of in-vivo mouse-brain vasculature sample obtained using the systems and methods described herein are illustrated. FIG. 13A includes six reverberation images, each from a different plane or layer within the sample. FIG. 13B illustrates the six reverberation images of FIG. 13A stacked together. FIG. 13C illustrates the six reverberation images of FIG. 13A merged together into a volume. All of the images illustrated in FIGS. 13A-13C were corrected for crosstalk.

Figure 14A:
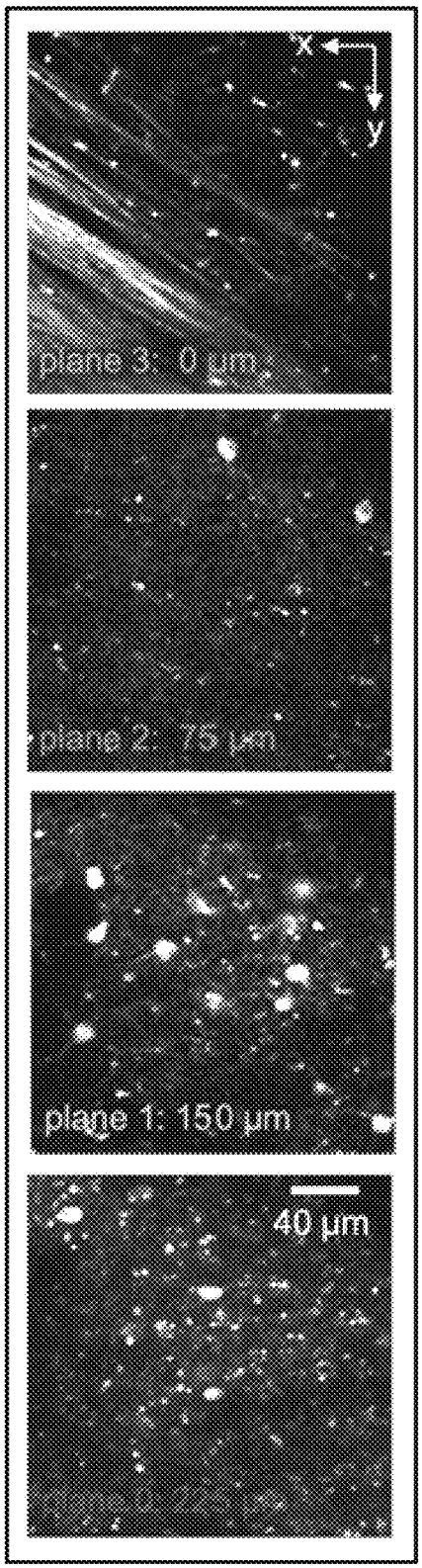
FIG. 14A illustrates images of a sample taken at different planes according to some implementations of the present disclosure.
Figure 14B:
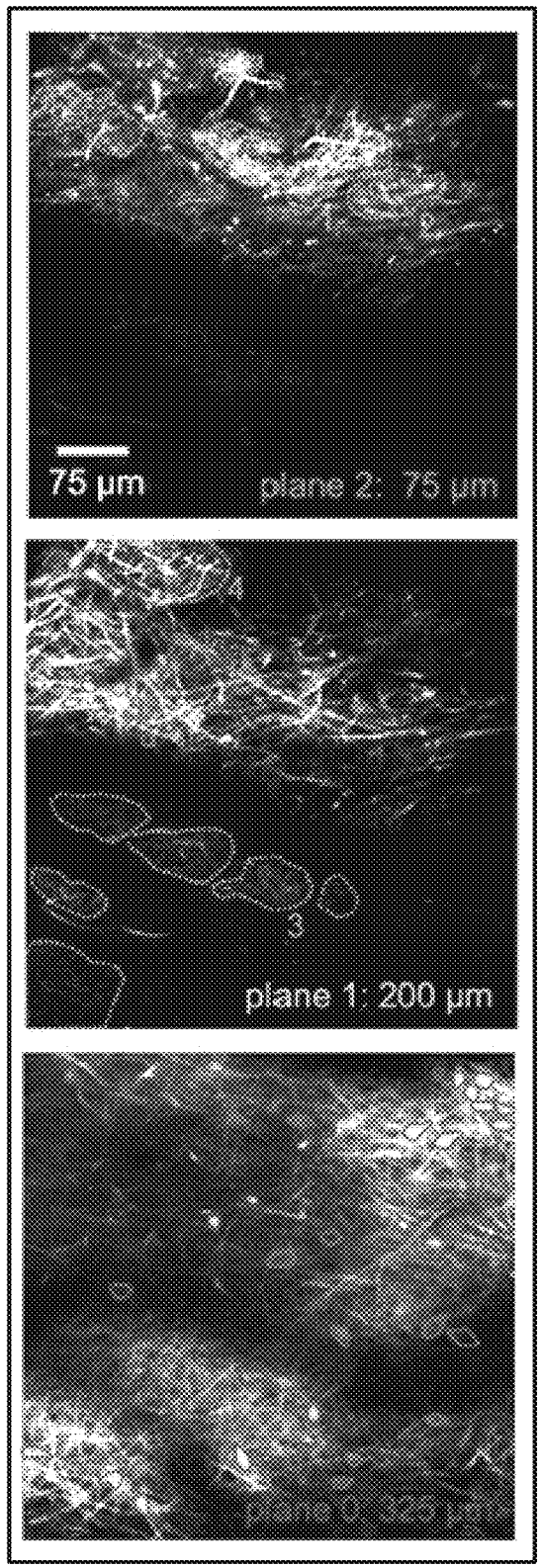
FIG. 14B illustrates time-averaged images of dendrites and somata in a sample according to some implementations of the present disclosure.
Figure 14C:
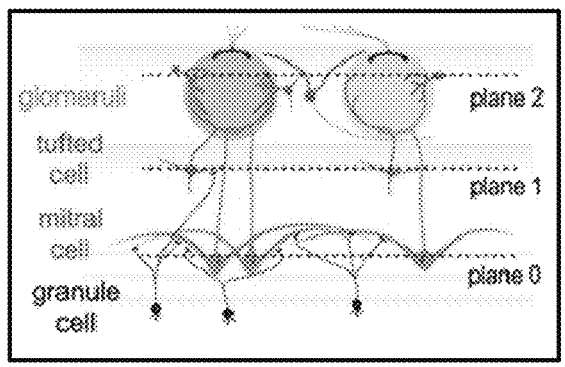
FIG. 14C is a schematic illustrating the intersection of imaging planes with neuropil and cell types at different depths according to some implementations of the present disclosure.
Figure 14D:
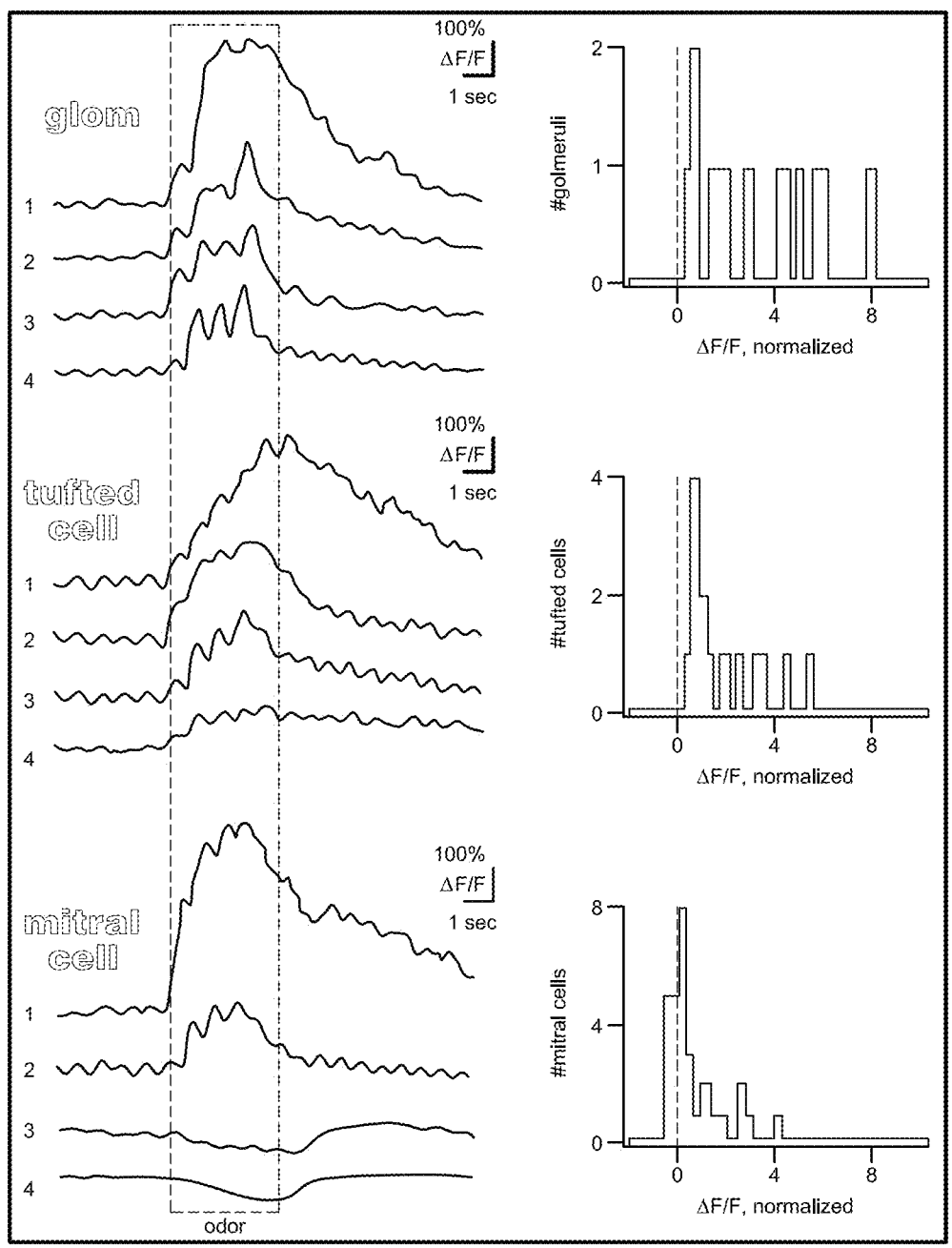
FIG. 14D illustrates representative traces showing sensory responses to an odorant and histograms illustrating the distribution of response strengths according to some implementations of the present disclosure.

Referring to FIG. 14A, four exemplary images of a neocortex sample taken from four different planes or depths (e.g., 0 microns, 75 microns, 150 microns, 225 microns) within the neocortex sample are illustrated. The four images of FIG. 14A were time averaged over a sixty second sampling window. The histograms illustrate activity of GCaMP6s-expressing neurons in each of the different planes or depths within the neocortex sample. Referring to FIG. 14B, three exemplary time-averaged images of dendrites and somata of GCaMP6f-expressing neurons within different planes or depths (e.g., 75 microns, 200 microns, 325 microns) of a main olfactory bulb are illustrated. FIG. 14C illustrates the intersection of imaging planes with neuropil and cell types at different depths. In this example, plane 0 is at a depth of 325 microns, plane 1 is at a depth of 200 microns, and plane 2 is at a depth of 75 microns. FIG. 14D illustrates representative traces showing sensory responses to an odorant (ethyl tiglate) and histograms indicating the distribution of response strengths in dendrites in the input layer (glomeruli) as well as distinct cell types that relay output to different cortical targets (tufted and mitral cells).

While the reverberation cavities 120, 220, 520, 920, and 1020 have described herein as being used with multiphoton fluorescence microscopy systems (e.g., two-photon microscopy or three-photon microscopy), in some implementations, the reverberation cavities 120, 220, 520, 920, and 1020 described herein can be used with other types of microscope systems that utilize pulsed illumination, such as, for example, second or third harmonic generation microscopes, Raman microscopes, photoacoustic microscopes, etc. Further, the reverberation cavities 120, 220, 520, 920, and 1020 described herein are not limited to pulsed lasers or to scanning microscopes. For example, in some implementations, the reverberation cavities described herein can be placed in the detection path (e.g., as opposed to the illumination path) of a non-scanning, camera-based standard wide field microscope, thus leading to extended depth of field (EDOF) imaging in a wide field configuration.

While the present disclosure has been described with reference to one or more particular embodiments and implementations, those skilled in the art will recognize that many changes may be made thereto without departing from the spirit and scope of the present disclosure. Each of these embodiments and implementations and obvious variations thereof is contemplated as falling within the spirit and scope of the present disclosure, which is set forth in the claims that follow.

ALTERNATIVE IMPLEMENTATIONS

Implementation 1

A method for obtaining one or more images of a sample using a microscope, the method comprising: dividing, using a reverberation cavity, a first one of a plurality of laser pulses into a plurality of sequential sub-pulses, each of the plurality of sequential sub-pulses having a power that is less than a previous one of the plurality of sequential sub-pulses; directing, using the one or more lenses of the microscope, the plurality of sequential sub-pulses onto a portion of the sample to generate a plurality of signals, each of the plurality of signals being associated with a different depth within the sample; and detecting the plurality of signals from the sample to generate the one or more images of at least a portion of the sample.

Implementation 2

The method according to implementation 1, wherein the reverberation cavity is configured to cause each of the plurality of sequential sub-pulses to be targeted to a depth within the sample that is less than a depth associated with a previous one of the plurality of sequential sub-pulses.

Implementation 3

The method according to implementation 1 or 2, wherein a power of each of the plurality of sequential sub-pulses is half of a power of the previous one of the plurality of sequential sub-pulses.

Implementation 4

The method according to any of implementations 1-3, wherein the directing of each of the plurality of sequential sub-pulses is separated from the directing of others of the plurality of sequential sub-pulses by a predetermined time interval.

Implementation 5

The method according to implementation 4, wherein the predetermined time interval between the directing of each of the plurality of sequential sub-pulses is between about 2 nanoseconds and about 10 nanoseconds.

Implementation 6

The method according to implementation 4, further comprising moving one or more mirrors of the reverberation cavity to adjust the predetermined time interval between each of the plurality of sequential sub-pulses.

Implementation 7

The method according to any one of implementations 1-6, wherein the plurality of laser pulses is emitted at a predetermined frequency.

Implementation 8

The method according to implementation 7, wherein the predetermined frequency of the plurality of laser pulses is between about 1 MHz and about 150 MHz.

Implementation 9

The method according to any one of implementations 1-8, wherein the detecting includes fully demultiplexing the plurality of signals such that each of the plurality of signals is associated with a different one of a plurality of output channels.

Implementation 10

The method according to implementation 9, further comprising generating data reproducible as a two-dimensional image of at least a portion of the sample based on demultiplxed signal data from each of the plurality of output channels.

Implementation 11

The method according to implementation 10, further comprising combining the two-dimensional images generated from the demultiplexed signal data from the plurality of output channels to obtain a three-dimensional volumetric image of at least a portion of the sample.

Implementation 12

The method according to any one of implementations 1-11, wherein the detecting includes at least partially demultiplexing the plurality of signals such that groups of the plurality of signals are associated with a plurality of output channels.

Implementation 13

The method according to implementation 12, further comprising generating data reproducible as a two-dimensional image of at least a portion of the sample based on demultiplexed signal data from the plurality of output channels.

Implementation 14

The method according to implementation 13, wherein each of the two-dimensional images is a partial extended-depth-of-field image.

Implementation 15

The method according to implementation 13, further comprising combining the two-dimensional images to obtain a three-dimensional volumetric image of at least a portion of the sample.

Implementation 16

The method according to any one of implementations 1-15, wherein the detecting includes integrating each of the plurality of signals into an output channel.

Implementation 17

The method according to implementation 16, further comprising obtaining data reproducible as a two-dimensional extended depth of field image of at least a portion of the sample from the output channel.

Implementation 18

The method according to any one of implementations 1-17, wherein each of the plurality of signals from the sample is a florescence signal.

Implementation 19

The method according to any one of implementations 1-18, wherein each of the plurality of sequential sub-pulses has a first color and each of the plurality of signals from the sample has a second color that is different than the first color.

Implementation 20

The method according to any one implementations 1-19, wherein the reverberation chamber includes a plurality of mirrors, a plurality of lenses, and a beamsplitter.

Implementation 21

A reverberation cavity for a microscope comprising a plurality of mirrors; one or more lens; and a beamsplitter being positioned such that responsive to a laser pulse being incident to the beamsplitter, the beamsplitter is configured to direct a first portion of the laser pulse to a two-dimensional scanner of the microscope and direct a second portion of the laser pulse to one of the plurality of mirrors, the plurality of mirrors and the plurality of lenses being positioned such that the second portion of the laser pulse is directed along a round-trip path length through the plurality of lenses and incident to the beamsplitter.

Implementation 22

The reverberation cavity according to implementation 21, wherein the plurality of mirrors includes a first pair of mirrors and a second opposing pair of mirrors, the plurality of lenses including a first lens and a second lens positioned between the first pair of mirrors and the second opposing pair of mirrors.

Implementation 23

The reverberation cavity according to implementation 22, wherein the second opposing pair of mirrors is coupled to a mirror translation stage configured to move the second opposing pair of mirrors relative to the first pair of opposing mirrors.

Implementation 24

The reverberation cavity according to implementation 23, wherein movement of the second opposing pair of mirrors along the mirror translation stage in a first direction increases the path length and movement of the second opposing pair of mirrors along the mirror translation stage in a second direction decreases the path length.

Implementation 25

The reverberation cavity according to any one of implementations 21-24, wherein each of the plurality of mirrors is positioned at an angle of 45 degrees.

Implementation 26

The reverberation cavity according to any one of implementations 21-25, wherein a power of the first portion of the laser pulse is substantially equal to a power of the second portion of the laser pulse.

Implementation 27

The reverberation cavity according to any one of implementations 21-26, wherein responsive to the second portion of the laser pulse being incident to the beamsplitter, the beamsplitter is configured to split the second portion of the laser pulse and direct a first sub-pulse to the two-dimensional scanner of the microscope and a second sub-pulse to one of the plurality of mirrors.

Implementation 28

The reverberation cavity according to implementation 27, wherein a power of the sub-pulse is less than a power of the first portion of the laser pulse.

Implementation 29

The reverberation cavity according to implementation 28, wherein the power of the sub-pulse is half of the power of the first portion of the laser pulse.

Implementation 30

The reverberation cavity according to any one of implementations 21-29, wherein the plurality of mirrors includes a first mirror, a second mirror, and a deformable mirror.

Implementation 31

The reverberation cavity according to any one of implementations 21-30, wherein the plurality of mirrors includes a first mirror and a second mirror and the plurality of lenses includes (i) a first lens positioned between the beamsplitter and the first mirror, (ii) a second lens positioned between the first mirror and the second mirror, and (iii) a third lens positioned between the second mirror and the beamsplitter.

Implementation 32

The reverberation cavity according to implementation 31, wherein the second lens is an electrically-tunable lens.

Implementation 33

A reverberation cavity for a microscope comprising a first pair of mirrors; an opposing second pair of mirrors that is moveable via a mirror translation stage relative to the first pair of mirrors to adjust a path length; a plurality of lenses positioned between the first pair of mirrors and the opposing second pair of mirrors along the path length; and a beamsplitter being positioned such that responsive to a laser pulse being incident to the beamsplitter, the beamsplitter is configured to a direct a first sub-pulse to a two-dimensional scanner of the microscope and a second sub-pulse to one of the first pair of mirrors such that the second sub-pulse is directed along the round-trip path length and returns to the beamsplitter.

Implementation 34

The reverberation cavity according to implementation 33, wherein movement of the opposing second pair of mirrors via the mirror translation stage in a first direction increases the path length and movement of the second opposing pair of mirrors along the mirror translation stage in a second direction decreases the path length.

Implementation 35

The reverberation cavity according to any of implementations 33 or 34, wherein each of the first pair of mirrors and the second pair of mirrors is positioned at an angle of 45 degrees.

Implementation 36

The reverberation cavity according to any one of implementations 33-35, wherein a power of the second sub-pulse is less than a power of the first sub-pulse.

Implementation 37

The reverberation cavity according to implementation 36, wherein the power of the second sub-pulse is half of the power of the first sub-pulse.

Implementation 38

The reverberation cavity according to any one of implementations 33-37, wherein the first sub-pulse corresponds to a first microscope sample depth and the second sub-pulse corresponds to a second microscope sample depth is than is less than the first microscope sample depth.

Implementation 39

A scanning microscope system for generating one or more images of a sample, the system comprising: a laser source configured to emit a plurality of laser pulses at a predetermined frequency; a reverberation cavity configured to (i) divide each of the plurality of laser pulses into a plurality of sequential sub-pulses, each of the plurality of sequential sub-pulses corresponding to a different depth within the sample and (ii) direct the plurality of sequential sub-pulses to a two-dimensional scanner, the two-dimensional scanner being positioned to direct the plurality of sequential sub-pulses inside the sample; a plurality of lenses positioned between the two-dimensional scanner and the sample location; and a detection mirror positioned to direct a plurality of signals from the sample location to a detection device, each of the plurality of signals corresponding to one of the plurality of sequential sub-pulses, the detection device being configured to associate the plurality of signals with one or more output channels.

Implementation 40

The system according to implementation 39, wherein the reverberation cavity is configured such that a power of each of the plurality of sequential sub-pulses is half of the power of the previous one of the plurality of sequential sub-pulses.

Implementation 41

The system according to implementations 39 or 40, wherein the directing of each of the plurality of sequential sub-pulses is separated from the directing of others of the plurality of sequential sub-pulses by a predetermined time interval.

Implementation 42

The system according to implementation 41, wherein the predetermined time interval between the directing of each of the plurality of sequential sub-pulses is between about 2 nanoseconds and about 10 nanoseconds.

Implementation 43

The system according to any one of implementations 39-42, wherein the reverberation cavity includes: a first pair of mirrors; an opposing second pair of mirrors that is moveable via a mirror translation stage relative to the first pair of mirrors to adjust a path length; a plurality of lenses positioned between the first pair of mirrors and the opposing second pair of mirrors along the path length; and a beamsplitter being positioned relative to the first and second pair of mirrors such that responsive to a laser pulse being incident to the beamsplitter, the beamsplitter is configured to a direct a first sub-pulse to the two-dimensional scanner and a second sub-pulse to one of the first pair of mirrors such that the second sub-pulse is directed along the path length and returns to the beamsplitter.

Implementation 44

The system according to implementation 39, wherein the predetermined frequency of the plurality of laser pulses is between about 1 MHz and about 150 MHz.

Implementation 45

The system according to implementation 39, wherein the detection device is configured to fully demultiplex the plurality of signals such that each of the plurality of signals is associated with a different one of a plurality of output channels.

Implementation 46

The system according to implementation 45, wherein the detection device is configured to generate data reproducible as a two-dimensional image of at least a portion of the sample from demultiplexed signal data from each of the plurality of output channels.

Implementation 47

The system according to implementation 46, wherein the detection device is configured to combine the two-dimen-

Implementation 48

The according to implementation claim 41, wherein the detection device is configured to at least partially demultiplex the plurality of signals such that groups of the plurality of signals are associated with a plurality of output channels.

Implementation 49

The system according to implementation 48, wherein the detection device is configured to generate data reproducible as a two-dimensional image of at least a portion of the sample from demultiplexed signal data from each of the plurality of output channels.

Implementation 50

The system according to implementation 49, wherein the detection device is configured to combine the two-dimensional images obtained from the plurality of output channels to obtain a three-dimensional volumetric image of at least a portion of the sample.

Implementation 51

The system according to implementation 39, wherein the detection device is configured to integrate each of the plurality of signals into an output channel and obtain data reproducible as a two-dimensional extended depth of field image of at least a portion of the sample from the output channel.

Implementation 52

The system according to implementation 39, wherein each of the plurality of signals is a fluorescence signal.

Implementation 53

The system according to implementation 52, wherein each of the plurality of sequential sub-pulses has a first color and each of the plurality of signals from the sample has a second color that is different than the first color.

Implementation 54

The system according to implementation 52, wherein the detection mirror is a dichromatic mirror.

Implementation 55

The system according to implementation 39, further comprising one or more lenses, one or more mirrors, or any combination thereof positioned between the reverberation cavity and the two-dimensional scanner.

Implementation 56

The system according to implementation 39, wherein the two-dimensional scanner includes a plurality of moveable mirrors to aid in positioning the plurality of sub-pulses on the sample.

Implementation 57

The system according to implementation 56, wherein a first one of the plurality of moveable mirrors is configured to aid in focusing the plurality of sequential sub-pulses in a first dimension and a second one of the plurality of moveable mirrors is configured to aid in focusing the plurality of sequential sub-pulses in a second dimension.

It is contemplated that any element or any portion thereof from any of implementations 1-57 above can be combined with any other element or elements or portion(s) thereof from any of implementations 1-57 to form an implementation of the present disclosure.

What is claimed is:

1. A method for obtaining one or more images of a tissue sample using a microscope, the method comprising:
   dividing, using a reverberation cavity, a first one of a plurality of laser pulses into a plurality of sequential sub-pulses, each of the plurality of sequential sub-pulses having a power that is less than a previous one of the plurality of sequential sub-pulses;
   directing, using the one or more lenses of the microscope, the plurality of sequential sub-pulses onto a portion of the tissue sample to generate a plurality of fluorescence signals, each of the plurality of fluorescence signals being associated with a different depth within the tissue sample;
   detecting the plurality of fluorescence signals from the tissue sample; and
   generating one or more images of at least a portion of the tissue sample based at least in part on the plurality of fluorescence signals.

2. The method of claim 1, wherein the reverberation cavity is configured to cause each of the plurality of sequential sub-pulses to be targeted to a depth within the tissue sample that is less than a depth associated with a previous one of the plurality of sequential sub-pulses.

3. The method of claim 1, wherein a power of each of the plurality of sequential sub-pulses is half of a power of the previous one of the plurality of sequential sub-pulses.

4. The method of claim 1, wherein the directing of each of the plurality of sequential sub-pulses is separated from the directing of others of the plurality of sequential sub-pulses by a predetermined time interval that is between about 2 nanoseconds and about 10 nanoseconds.

5. The method of claim 4, further comprising moving one or more mirrors of the reverberation cavity to adjust the predetermined time interval between each of the plurality of sequential sub-pulses.

6. The method of claim 1, wherein the plurality of laser pulses is emitted at a predetermined frequency that is between about 1 MHz and about 150 MHz.

7. The method of claim 1, wherein the detecting includes fully demultiplexing the plurality of fluorescence signals such that each of the plurality of fluorescence signals is associated with a different one of a plurality of output channels.

8. The method of claim 7, further comprising generating data reproducible as a two-dimensional image of at least a portion of the tissue sample based on demultiplexed signal data from each of the plurality of output channels.

9. The method of claim 8, further comprising combining the two-dimensional images generated from the demultiplexed signal data from the plurality of output channels to obtain a three-dimensional volumetric image of at least a portion of the tissue sample.

10. The method of claim 1, wherein the detecting includes at least partially demultiplexing the plurality of fluorescence signals such that groups of the plurality of fluorescence signals are associated with a plurality of output channels.

11. The method of claim 10, further comprising generating data reproducible as a two-dimensional image of at least a portion of the tissue sample based on demultiplexed signal data from the plurality of output channels.

12. The method of claim 11, wherein each of the two-dimensional images generated based on the demultiplexed signal data from the plurality of output channels is a partial extended-depth-of-field image.

13. The method of claim 11, further comprising combining the two-dimensional images to obtain a three-dimensional volumetric image of at least a portion of the tissue sample.

14. The method of claim 1, wherein the detecting includes integrating each of the plurality of fluorescence signals into an output channel.

15. The method of claim 14, further comprising obtaining data reproducible as a two-dimensional extended depth of field image of at least a portion of the tissue sample based on data from the output channel.

16. The method of claim 1, wherein each of the plurality of sequential sub-pulses has a first color and each of the plurality of fluorescence signals from the tissue sample has a second color that is different than the first color.

17. A reverberation cavity for a microscope comprising:
a plurality of mirrors;
a plurality of lenses; and
a beamsplitter positioned such that responsive to a laser pulse being incident to the beamsplitter, the beamsplitter is configured to direct a first portion of the laser pulse to a two-dimensional scanner of the microscope and direct a second portion of the laser pulse to one of the plurality of mirrors,
wherein the plurality of mirrors and the plurality of lenses are positioned such that the second portion of the laser pulse is directed along a path length from one of the plurality of mirrors through a first lens of the plurality of lenses to another one of the plurality of mirrors and then through a second lens of the plurality of lenses.

18. The reverberation cavity of claim 17, wherein the plurality of mirrors includes a first pair of mirrors and a second opposing pair of mirrors, wherein the first lens and the second lens are positioned between the first pair of mirrors and the second opposing pair of mirrors.

19. The reverberation cavity of claim 18, wherein the second opposing pair of mirrors is coupled to a mirror translation stage configured to move the second opposing pair of mirrors relative to the first pair of opposing mirrors.

20. The reverberation cavity of claim 19, wherein movement of the second opposing pair of mirrors along the mirror translation stage in a first direction increases the path length and movement of the second opposing pair of mirrors along the mirror translation stage in a second direction decreases the path length.

21. The reverberation cavity of claim 17, wherein each of the plurality of mirrors is positioned at an angle of 45 degrees.

22. The reverberation cavity of claim 17, wherein responsive to the second portion of the laser pulse being incident to the beamsplitter, the beamsplitter is configured to split the second portion of the laser pulse and direct a first sub-pulse to the two-dimensional scanner of the microscope and a second sub-pulse to one of the plurality of mirrors.

23. The reverberation cavity of claim 17, wherein the plurality of mirrors includes a first mirror, a second mirror, and a deformable mirror.

24. The reverberation cavity of claim 17, wherein (i) the first lens is positioned between the beamsplitter and a first mirror of the plurality of mirrors, (ii) the second lens is positioned between the first mirror and a second mirror of the plurality of mirrors, and (iii) a third lens of the plurality of lenses is positioned between the second mirror and the beamsplitter.

25. A reverberation cavity for a microscope comprising:
a first pair of mirrors;
an opposing second pair of mirrors that is moveable via a mirror translation stage relative to the first pair of mirrors to adjust a path length;
a plurality of lenses positioned between the first pair of mirrors and the opposing second pair of mirrors along the path length; and
a beamsplitter being positioned such that responsive to a laser pulse being incident to the beamsplitter, the beamsplitter is configured to a direct a first sub-pulse to a two-dimensional scanner of the microscope and a second sub-pulse to one of the first pair of mirrors such that the second sub-pulse is directed along the path length and returns to the beamsplitter.

26. The reverberation cavity of claim 25, wherein movement of the opposing second pair of mirrors via the mirror translation stage in a first direction increases the path length and movement of the second opposing pair of mirrors along the mirror translation stage in a second direction decreases the path length.

27. The reverberation cavity of claim 25, wherein the first sub-pulse corresponds to a first microscope sample depth and the second sub-pulse corresponds to a second microscope sample depth is than is less than the first microscope sample depth.

28. A scanning microscope system for generating one or more images of a sample, the system comprising:
a laser source configured to emit a plurality of laser pulses at a predetermined frequency;
a reverberation cavity configured to (i) divide each of the plurality of laser pulses into a plurality of sequential sub-pulses, each of the plurality of sequential sub-pulses configured to penetrate to a different depth within the sample and (ii) direct the plurality of sequential sub-pulses to a two-dimensional scanner, the two-dimensional scanner being positioned to direct the plurality of sequential sub-pulses inside the sample;
a plurality of lens positioned between the two-dimensional scanner and the sample location; and
a detection mirror positioned to direct a plurality of signals from the sample location to a detection device, each of the plurality of signals corresponding to one of the plurality of sequential sub-pulses, the detection device being configured to associate the plurality of signals with one or more output channels.

29. The system of claim 28, wherein the reverberation cavity includes:
a first pair of mirrors;
an opposing second pair of mirrors that is moveable via a mirror translation stage relative to the first pair of mirrors to adjust a path length;
a plurality of lens positioned between the first pair of mirrors and the opposing second pair of mirrors along the path length; and
a beamsplitter being positioned relative to the first and second pair of mirrors such that responsive to a laser pulse being incident to the beamsplitter, the beamsplitter is configured to a direct a first sub-pulse to the two-dimensional scanner and a second sub-pulse to one of the first pair of mirrors such that the second sub-pulse is directed along the path length and returns to the beamsplitter.

\* \* \* \* \*